US006867708B2

(12) United States Patent
Darby, Jr. et al.

(10) Patent No.: US 6,867,708 B2
(45) Date of Patent: Mar. 15, 2005

(54) COMMUNICATIONS SYSTEM AND METHOD FOR INTERCONNECTED NETWORKS HAVING A LINEAR TOPOLOGY, ESPECIALLY RAILWAYS

(76) Inventors: Albert Donald Darby, Jr., 3700 Ponderosa Rd., Valkaria, FL (US) 32950; David Poltz, 4374 Parkway Dr., Melbourne, FL (US) 32934; Mark Hefner, 395 Rio Palma S., Indiatlantic, FL (US) 32903; Irfan Ali, 1134 Phoenix Ave., Schenectady, NY (US) 12308; William Schoonmaker, 201 Plantation Club Dr., #1103, Melbourne, FL (US) 32940; George Jarman, 5613 Loblolly Pl., Grant, FL (US) 32949

( * ) Notice: Subject to any disclaimer, the term of this patent is extended or adjusted under 35 U.S.C. 154(b) by 0 days.

(21) Appl. No.: 09/942,624

(22) Filed: Aug. 31, 2001

(65) Prior Publication Data

US 2002/0027495 A1 Mar. 7, 2002

Related U.S. Application Data

(62) Division of application No. 09/042,722, filed on Mar. 17, 1998, now Pat. No. 6,400,281.
(60) Provisional application No. 60/040,585, filed on Mar. 17, 1997, provisional application No. 60/040,586, filed on Mar. 17, 1997, provisional application No. 60/044,333, filed on Mar. 27, 1997, provisional application No. 60/043,753, filed on Apr. 9, 1997, provisional application No. 60/064,529, filed on Nov. 5, 1997, and provisional application No. 60/066,304, filed on Nov. 25, 1997.

(51) Int. Cl.$^7$ .............................. G08G 1/01; H04B 3/36
(52) U.S. Cl. ........................ 340/933; 340/505; 340/3.5; 246/167 R; 370/315
(58) Field of Search ........................ 340/933, 3.5, 505; 455/7, 11.1; 701/19; 370/274, 327, 217, 312, 315, 226, 227; 714/713; 375/211, 214; 246/167 R, 187

(56) References Cited

U.S. PATENT DOCUMENTS

| | | |
|---|---|---|
| 2,748,266 A | 5/1956 | Boyd |
| 3,628,147 A | 12/1971 | Makino |
| 4,511,958 A | 4/1985 | Funk |
| 4,553,723 A | 11/1985 | Nichols et al. |
| 4,582,280 A | 4/1986 | Nichols et al. |
| 4,638,298 A | 1/1987 | Spiro |
| 4,723,737 A | 2/1988 | Mimoun |
| 4,799,052 A | 1/1989 | Near et al. |
| 4,947,484 A | 8/1990 | Twitty et al. |
| 5,010,332 A | 4/1991 | Egami |
| 5,039,038 A | 8/1991 | Nichols et al. |
| 5,077,554 A | 12/1991 | Orita et al. |
| 5,265,832 A | 11/1993 | Wesling et al. |
| 5,311,512 A | 5/1994 | Bartis et al. |
| 5,347,515 A | 9/1994 | Marino |
| 5,351,919 A | 10/1994 | Martin |
| 5,377,938 A | 1/1995 | Bezos et al. |
| 5,408,679 A | 4/1995 | Masuda |
| 5,420,883 A | 5/1995 | Swensen et al. |

(List continued on next page.)

Primary Examiner—Donnie L. Crosland
(74) Attorney, Agent, or Firm—Duane Morris LLP

(57) ABSTRACT

A system and method for communicating over networks, particularly generally-linear networks such as a netowrk of railcars in a railway train. The disclosed system and method include the relaying of packets which may contain plural messages down a line of nodes. Acknowledgement of the packets is obtained implicitly by listening to a subsequenct relay of the packet and retransmission of the packet is effected on a diverse antenna in the event of non-acknowledgement. Message bandwidth is shared among the nodes of the system by a message priority system and by the reservation of portions of a packet for certain types of messages. Message bandwidth is also shared by the use of groups of nodes as relay partcipiants and by periodically changing the group which is peforming the relay operations.

35 Claims, 8 Drawing Sheets

U.S. PATENT DOCUMENTS

| | | |
|---|---|---|
| 5,428,603 A | 6/1995 | Kivett |
| 5,434,984 A | 7/1995 | Deloddere et al. |
| 5,435,505 A | 7/1995 | Martin |
| 5,448,563 A | 9/1995 | Taniguchi |
| 5,465,081 A | 11/1995 | Todd |
| 5,481,532 A | 1/1996 | Hassan et al. |
| 5,481,539 A | 1/1996 | Hershey et al. |
| 5,570,284 A | 10/1996 | Roselli et al. |
| 5,592,483 A | 1/1997 | Hieda et al. |
| 5,623,413 A | 4/1997 | Matheson et al. |
| 5,651,517 A * | 7/1997 | Stevens et al. ......... 246/167 R |
| 5,681,015 A * | 10/1997 | Kull ....................... 246/187 C |
| 5,720,455 A | 2/1998 | Kull et al. |
| 5,835,005 A | 11/1998 | Furukawa et al. |
| 5,896,565 A * | 4/1999 | Miller ....................... 340/539 |
| 5,986,579 A | 11/1999 | Halvorson |
| 6,114,974 A | 9/2000 | Halvorson |

* cited by examiner

| Groups (nominal hop distance) | ID no | A | B | C | D | E | F |
|---|---|---|---|---|---|---|---|
| Default Single Relay Group | 0 | 0<br>0x00 | - | - | - | - | - |
| Single Relay Group Solution | 1 | 1<br>0x01 | - | - | - | - | - |
| Two Relay Group Solution | 2 | 2<br>0x02 | 3<br>0x03 | - | - | - | - |
| Three Relay Group Solution | 3 | 4<br>0x04 | 5<br>0x05 | 6<br>0x06 | - | - | - |
| Four Relay Group Solution | 4 | 7<br>0x07 | 8<br>0x08 | 9<br>0x09 | 10<br>0x0A | - | - |
| Five Relay Group Solution | 5 | 11<br>0x0B | 12<br>0x0C | 13<br>0x0D | 14<br>0x0E | 15<br>0x0F | - |
| Six Relay Group Solution | 6 | 16<br>0x10 | 17<br>0x11 | 18<br>0x12 | 19<br>0x13 | 20<br>0x14 | 21<br>0x15 |

Relay Group Identification Number Table

FIGURE 6

| Byte | Bits | Name | Description |
|---|---|---|---|
| 0-3 | 1 | Write-over Flag | 1 = write over, 0 = no write over. |
|  | 1 | Rebound Flag | 1 = wrap at reversing node, 0= delete at reversing node. |
|  | 10 | Source Address | Logical Node Address of the ADU's source |
|  | 10 | Destination Address 1 | First Logical Node Address in destination address range |
|  | 10 | Destination Address 2 | Last Logical Node Address in destination address range. |
| 4 | 8 | ADU Length | Length of current ADU (less the eight bytes of overhead.) This value is 0 - 64, or 0 - 255 for special code download ADUs. |
| 5 | 8 | Source Application ID | Defines the source application (to be used foe addressing responses). |
| 6 | 8 | Destination Application ID | Defines the destination application. |
| 7 | 8 | ADU Type | Application specific identifier for the ADU. |
| 8-n | - | Embedded ADU data | 0 to 64 byte ADU data field (or 0 to 255 byte ADU data field for code download ADUs.) |
| n+1 | 8 | Checksum | 2's Complement checksum calculated on the entire packet |

FIGURE 7

| Byte | Bits | Name | Description |
|---|---|---|---|
| 0-1 | 16 | Circuit Identification Code (LSBs) | Low order 16 bits of the 24 bit circuit identification code for the communications circuit associated with the packet. |
| 2 | 8 | Circuit Identification Code (MSB) | High order 8 bits of the 24 bit circuit identification code for the communications circuit associated with the packet. |
| 3 | 1 | Token Type | 1 = SMOKEN, 0 = Normal |
| 3 | 1 | reserved | Currently unused bit. |
| 3 | 5 | Sequence Count | Sequence count identifies each new token transmitted from pilot node. |
| 3 | 1 | Direction Flag | Marks packet as inbound or outbound, 1 = inbound. |
| 4 | 4 | Hop Distance | Value that, when added to the Destination Node Address, indicates the source of the transmission. |
| 4-5 | 12 | Hop Count | Hop count value for the current transmission of this packet. |
| 6 | 1 | Short Path Flag | Set for a non-SMOKEN token that was reversed before the reversing node. |
| 6 | 5 | Relay Group | Relay group associated with the packet. |
| 6-7 | 10 | Destination Node Address | Next node to relay current token for synchronous token, local node address for an asynchronous transmission. |
| 8 | 2 | reserved | Currently unused field. |
| 8 | 6 | ADU Count | Number of ADU's embedded in current RDU. |
| 9-n | - | Embedded ADUs | Zero to sixty three embedded ADU elements. |
| n-(n+3) | 32 | Cyclic Redundancy Check (CRC) | Packet verification CRC based on CCITT standard algorithm. |

FIGURE 8

COMMUNICATIONS SYSTEM AND METHOD FOR INTERCONNECTED NETWORKS HAVING A LINEAR TOPOLOGY, ESPECIALLY RAILWAYS

RELATED APPLICATIONS

This application is a division of application Ser. No. 09/042,722, filed Mar. 17, 1998, now U.S. Pat. No. 6,400, 281, which claims benefit of U.S. Provisional Application No. 60/040,585, filed Mar. 17, 1997, and claims benefit of U.S. Provisional Application No. 60/040,586, filed Mar. 17, 1997, and claims benefit of U.S. Provisional Application No. 60/044,333, filed Mar. 27,1997, and claims benefit of U.S. Provisional Application No. 60/043,753, filed Apr. 9, 1997, and claims benefit of U.S. Provisional Application No. 60/064,529 filed Nov. 5, 1997, and claims benefit of U.S. Provisional Application No. 60/066,304, filed Nov. 25, 1997.

BACKGROUND OF THE INVENTION

The present application is related generally to systems and methods for communicating with nodes in a linear network and in particular to a system and method for communicating among and controlling rail vehicles.

For many years, railway freight trains have operated with pneumatic brakes for both the locomotive and the rail cars. In a typical system, the locomotive supplies pressurized air to the railcars through a brake pipe which extends the length of the train. The brake pipe of each rail car is typically connected to the brake pipe of adjacent vehicles via a flexible hose connector often called a glad hand. The brake pipe serves to supply both the pressurized air used by the railcars to drive their brake cylinders but also as a means for communicating when the railcars should apply or release their brakes. In a typical prior art pneumatic brake system, the locomotive commands the railcars to apply their air brakes by causing a drop in pressure (of 7 to 25 pounds of air) in the brake pipe. Each railway car, in turn, senses the drop in air pressure in the brake pipe and applies air from a local reservoir to the brake cylinder(s) on its wheels in an amount proportional to the changes in the brake pipe pressure and effects a stoppage of the train. When the brakes are to be released, the locomotive increases the pressure in the brake pipe, which is interpreted as a command to release the brakes by the rail cars.

The foregoing described pneumatic braking system has been used for many years and has the advantage of being entirely pneumatic. Such systems, however, are known to have several deficiencies. For example, because the command signal (the drop in air pressure) is a pneumatic signal, it must be propagated along the brake pipe. Accordingly, on long trains, it can take many seconds for the braking signal to propagate to the end of the train. Thus, for this period of propagation, not all the cars in the train are braking. Generally, the propagation of the braking signal is much less than the speed of sound for normal braking and the signal may need over a minute to propagate along a train of 150 cars. Because the braking applied is a function of the pressure change seen at each railcar, the precision to which the brake application can be controlled is degraded both by the propagation characteristics of the brake pipe and the leakage that is typically observed in the brake pipe closed pneumatic system.

In a typical prior art pneumatic braking system, there is no provision for partially releasing brakes. Once a brake release signal is received via the brake pipe, each rail car fully release its brakes. In many instances, it would be desirable for the train operator to be able to effect only a partial release, such as when too much braking has been applied in a train and it is desried to reduce the level of braking without fully releasing the brakes.

It is a further known limitation of many prior art railway braking systems that such systems do not provide for variability among the railcars in the amount of braking applied. When all railcars are braked in the same amount, some of the railcars will decelerate faster than others (e.g., empty cars will decelerate more quickly). Because the railcars are interconnected, the different braking results stemming from railcar characteristics can cause considerable forces to be generated between cars causing considerable stress on the car draft gear and coupler. Because of the in-train forces which can be generated by the variable effects of a single braking command, train operators must brake their trains judiciously, and generally, at less of a deceleration rate than would otherwise be possible to avoid uncouplings and derailings.

In the typical prior art pneumatic braking systems, it is also known that little additional information can be communicated along the brake pipe except for the relatively simple brake apply and release signals. For example, if a railcar in the middle of a train has a cargo that must be kept at a particular condition, there is no way in the typical pneumatic air brake system for monitoring the status of such a railcar and to provide a warning if the required conditions are not being experienced. For another example, it is highly desireable to learn immediately if a remote node has experienced a critical failure or emergency condition.

Over the last couple of decades, and particularly recently, electronic improvements to railway braking and control systems have been introduced. For example, communications have been established between plural locomotives, remote from each other, in a train so that a single operator can control the throttle and brakes of locomotives spaced throughout a train. This system, known as the LOCOTROL$_{TM}$ system, utilizes a radio frequency link between a lead locomotive and one or more trailing locomotives to control the throttle and braking at the various locomotives. The LOCOTROL system provides both for a more even pulling of the railcars and for an improved braking performance because each locomotive can effect the braking signals using the speed of the RF communications rather than the slower speed of the pneumatic brake pipe signal. For another example of the improvements already obtained by the use of electronics in the railway locomotives, in one electronic system, the pneumatic braking valves at the locomotive which control the brake pipe have been replaced by electronic sensors and actuators which provide for more reliable control of the brake pipe signals. In another change, braking systems have been proposed in which the brakes at each railcar are electronically operated in response to electrical signals carried by an electrical wire which passes through and between each railcar in a train. While a wired braking system provides the benefit of braking signal propagation at the speed of light, the wires which carry the braking signals from car to car are subjected to a harsh environment and may be susceptible to damage. Worse, a break or disconnection in the wire controlling the train will result in an undesired emergency braking of the train.

There is a considerable body of prior art related to the passing of messages among plural RF transceivers, which can be considered nodes in a radio network. It is known and often desirable to communicate among multiple nodes, each node having a transceiver capable of transmitting and receiving messages from other similar nodes. Often, such nodes are configured circularly about a master node and each of the nodes is well within range of each other and the master node. Under such circumstances, asynchronous protocols such as collision detection are adequate, as are synchronous protocols which rely on timing messages from a master node. However, if the nodes are not generally circular, such protocols may be unsuitable. For example, in a railroad train with two or more cars acting as nodes in a communications system, the network is generally linear and the last node in the network may vary substantially from the second node in its ability to communicate with the first node. While high-powered, robust transceivers could be used so that sufficient power is available to communicate with even the most remote nodes, such equipment is both relatively expensive and impractical for a railroad in which the cars are typically unpowered, requiring an associated transceiver to be based on battery or locally-generated power. Moreover, even if sufficient power is provided to the transceivers to communicate between the furthest nodes, trains frequently operate in a manner where portions of the train are out of communication for a variety of reasons. For example, tunnels can render a number of nodes in the train incommunicado for the length of the tunnel. Urban environments may have man-made obstructions blocking the line of sight between the beginning and end of the train. Natural objects likes mountains may also be interposed in the line of sight between the beginning and end of the train. Thus, even with increased transmission power, it is not possible to ensure continuous RF communications between all of the cars in a railroad train or other similar linear network.

Often the communications needs for linear topology networks require a high degree of reliability. Messages may need to be received by all the desired nodes to effect a change. For example, if a communications system is used to transmit braking commands from a locomotive to other locomotives or to cars within a train, it is critical that the commands be rapidly and reliably communicated to the desired nodes. Receipt of messages may be confirmed by the transmission of an acknowledgment signal back to the sending node. However, in a linear topology where the receiving node may have a different transmission power that the sending node and where the environment constantly changes, the receiving node may not be able to merely transmit an acknowledgment message which will be received at the original sending node. In such prior art systems, the failure of the original node to receive an acknowledgment usually entails another attempt at sending the original message to the same node. Clearly, if the intended receiver in fact received the original message, re-sending the unacknowledged message wastes the available massaging bandwidth of the system.

One way known in prior art systems to transmit messages along a linear network is to have each node in linear succession along the network receive, acknowledge and retransmit each message to the next successive node. With many nodes in the linear network, a train, for example, can have well over two hundred cars, the message may take an unacceptably long time to travel the length of the network, particularly if the RF environment is impaired. In addition, such systems are susceptible to blocking along the line of nodes if one or more nodes in succession are inoperative.

When the linear network is moving, as in the case of a railroad train, there are different problems than those encountered in a fixed location. For example, a train with a communications system will often encounter other trains as it moves down the tracks. If the two trains are using the same type of communications system, there must be a way to prevent the communications of the first train from interfering with or being mistaken for the communications of the second train.

Another serious problem faced by mobile linear networks is the fact that the surrounding environment is constantly changing. In such circumstances, nodes which are in communication at one point in time may be out of communication at still another point in time. The dynamic nature of node communication makes it difficult to reliably communicate within the nodes of a train as their geographic position and environment are constantly changing. One solution to this problem is to use a network with adjacent nodes communicating among one another. However, this solution is relatively slow and susceptible to blockage by the failure of one or more nodes. The long time required to complete a message may prohibit this solution. Further, this technique does not take into account the ability of a linear network to simultaneously transmit from multiple nodes when there are short range transmitters. In other words, the length of a linear network like a train may permit the network to operate in a time-bandwidth-space mode. The available bandwidth at one time may be used differently at different nodes in the linear network. As noted below, the present invention makes available time-bandwidth-space signaling which is particularly useful in linear networks such as long trains.

Accordingly, it is an object of the present invention to provide a novel communications system and method which obviates these and other problems of communicating among plural nodes.

It is another object of the present invention to provide a novel communications system and method which communicates efficiently along the nodes of a linear network.

It is yet another object of the present invention to provide a novel communications system and method of communicating along a network without the use of an external or master timing source.

It is still another object of the present invention to provide a novel communications system and method of communicating in a network in which the ability of particular nodes to communicate with other nodes varies over time.

It is a further object of the present invention to provide a novel communications system and method of communicating in a linear network in which messages are not blocked by the failure of one or more successive nodes.

It is yet a further object of the present invention to provide a novel communications system and method of communicating in a linear network in which messages are forwarded to a node that is several nodes away, that distance being reduced when required in order to provide reliable communications in adverse conditions.

It is still a further object of the present invention to provide a novel communications system and method for communicating among plural nodes which efficiently uses the available bandwidth, time and space to schedule the transmissions of messages.

It is another object of the present invention to provide a novel communications system and method of communicating in a linear network along a mobile network which avoids radio interference with other similar networks which are geographically proximate.

It is still another object of the present invention to provide a novel system and method of communicating in a railroad train environment which utilizes both diversity and redundancy to efficiently and reliably communicate messages.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 6 is a table showing relay group configurations which may be used in a system of the present invention.

FIG. 7 is a table illustrating a message format which may be used for Application Data Units in a system of the present invention.

FIG. 8 is a table illustrating a message format which may be used for Radio Data Units in a system of the present invention.

DESCRIPTION OF PREFERRED EMBODIMENTS

The present invention is described herein with particular reference to a railway system. Although one embodiment of the present invention finds considerable usefulness in such systems, it is not limited thereto and, as will be appreciated to those skilled in the art, is applicable to other communication systems, especially those used in networks wherein the various nodes are not generally within a circular cluster.

Figure 1:
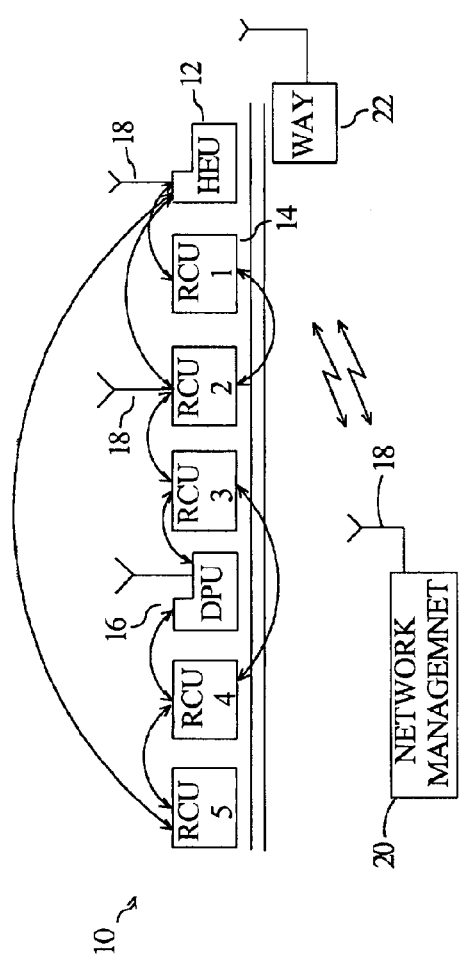
FIG. 1 is a simplified pictorial diagram of a train system in which the present invention may be utilized.

With reference now to FIG. 1, the present invention may be used in a train 10, comprising a Head End Unit ("HEU") 12, plural Rail Car Units ("RCU") 14, and one or more Distributed Power Units ("DPU") 16. The HEU may communicate with one or more of the RCUs through a radio link through antennas 18 associated with the HEU and with each of the RCUs with which communication is to be established. Similarly, the HEU 12 may communicate with each of the DPUs 16 and any other similar assets on the train through the antennas 18. As detailed below, the RCUs 14 may likewise communicate with the HEU 12, the DPU 16 and with other RCUs within the train 10. Throughout this description, the terms "radio link", "RF communications" and similar terms are used to describe a method of communicating between two links in a network system. It should be understood that the linkage between nodes in a system in accordance with the present invention is not limited to radio or RF systems or the like and is meant to cover all means by which messages may be delivered from one node to another or to plural others, including without limitation, magnetic systems, acoustic systems, and optical systems. Likewise, the system of the present invention is described in connection with an embodiment in which radio (RF) links are used between nodes and in which the various components are compatible with such links; however, this description of the presently preferred embodiment is not intended to limit the invention to that particular embodiment.

With continued reference to FIG. 1, the HEU 12 may also communicate via a radio link with a Network Management site 20. Likewise, the Network management site 20 may communicate via a radio link with various Wayside Units ("WU") 22 which are associated with the track on which the train 10 is to be run. The WUs control and/or communicate with various track resources, such as switches, train presence detectors, broken rail detectors, hot box detectors, signals, etc. conventionally used in railway systems. A WU may be a part of and control a single device, such as a switch, or may be a control processor which communicates with and controls several devices (generally located near each other) such as a switch, train detectors on the track segments associated with the switch and signal apparatus associated with the switch.

In operation, the radio links of the RCUs, the HEU, the DPUs, the WUs and the Network Management site may be operatively connected in a conventional fashion to transceivers (not shown), decoders (not shown) and to control processors (not shown). As is well known, the control processors may control one or more devices associated with the HEU or the RCUs. For example, the control processor on the RCU may control the application of brakes by the RCU. Similarly, the RCUs, WUs, DPUs and the HEU may include remote monitoring/measuring devices which report various conditions to the control processor, which can in turn be reported through the radio link to other elements. For example, one or more of the RCUs may include a meter to measure the air pressure in the brake pipe of a air brake system. In an exemplary-system, the pressure within the brake pipe at a particular RCU may be measured by such a meter, reported to the control processor, and communicated to the HEU or other RCUs.

RCUs within a train may consist of any type of vehicle, and may include, for example, conventional rail cars, locomotives, train end units, and/or auxiliary power plants.

In operation, the Network Management site 20 may obtain and communicate to the HEU 12 information needed to operate the train. Such information may include a schedule for the train to implement, movement plans, speed commands, movement authorities within which a train 10 is authorized to operate, control information for one or more RCUs. Similarly, the HEU 12 may communicate to the Network Management site 20 information regarding the status of the train and its various components, such as the location of the train, the speed and direction of the train, the energy consumption of the train, information provided by the control processors at the RCUs (e.g., concerning the status of an RCU 14 or its contents). The Network Management site 20 may also communicate with and/or control the WUs 22 to set the conditions of the track as appropriate for the schedule being carried out. For example, the Network Management site 20 may command the position of switches to cause the train 10 to be carried along the appropriate track safely. The network Management site 20 may also receive signals from the devices associated with the WUs, such as the various detectors indicated above, which identify the location and potential problems with the train 10. A further and exemplary description of such a Network Management site having some of the foregoing characteristics may be found in U.S. Pat. No. 5,623,413 issued Apr. 22, 1997 to Matheson, et al.

Generally, it would be expected that the Network Management site 20 would simultaneously communicate with and control many trains within a particular geographic area of responsibility and would alter the track resources, such as the switches and signals, to safely operate each of the trains according to the desired schedule. Often, the Network Management site 20 will also have the capability of rescheduling the trains within its control to account for unexpected conditions. Under such circumstances, the new schedules would be communicated to the HEUs 12 at the trains. Because the revised schedules may affect operations being carried on in one or more of the RCUs 14, the rescheduling activity may also require that some of the RCUs by the Network Management site 20 be commanded to alter its current or planned operation. For example, if an RCU 14 is a refrigerated car, the RCU could be controlled to gradually raise the temperature in the car so that the rail car is at a particular temperature at the time of its expected arrival. If the rescheduling activity of the Network Management site 20 determines that the subject RCU may now reach its destination an hour earlier than previously expected, control information can be communicated to the RCU, through its associated HEU 12, to begin raising the temperature in the railcar earlier than previously determined.

Because each of the elements needed to run the train safely are within the control of the Network Management site 20, rescheduling can be accomplished readily to account for unplanned events. The Network Management site 20 can communicate the revised schedules, authorities, etc. to the trains for execution by the trains and the Network Management site 20 can control the track resources through the WUs to carry out the revised schedule.

Figure 2:
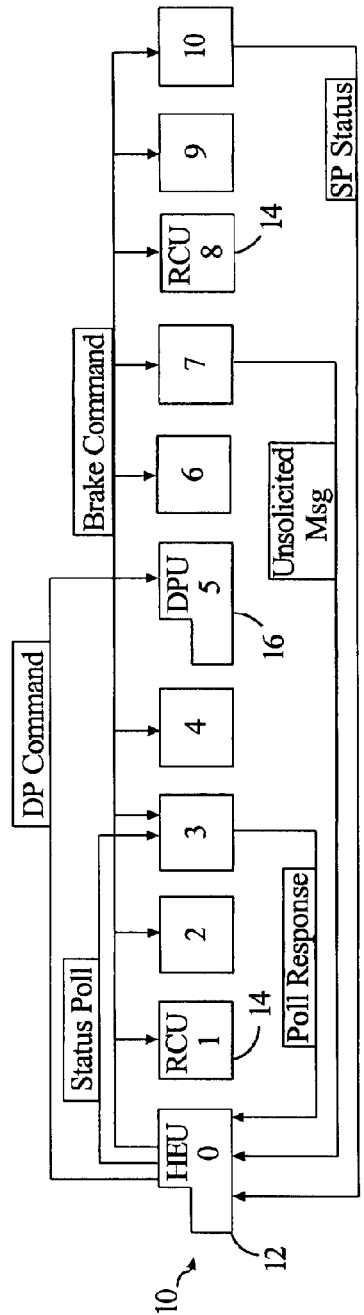
FIG. 2 is a schematic diagram depicting the transmission of command messages and a response message of the command/response interaction in a system of the present invention.

With reference now to FIG. 2 where like elements are provided with the same reference numeral as in FIG. 1, communications within a train 10 carrying out one embodiment of the present invention generally require a flow of messages to and from the various vehicles of the train. For example, train control at steady state will usually require a regular (repeated, periodic) communication from the HEU to all RCUs ("Status Poll") Similarly, the communication should accommodate regular (repeated, periodic) checks of the brake supply pipe pressure at the end of the train (assuming that the bakes are pneumatic). The HEU should be able to direct communications to individual cars ("DP Command"), or alternatively, to all of the cars at once ("Brake Command"). The HEU should also be able to obtain information regarding the status (function, health, conditions, etc.) regarding all applications running on all of the cars. The HEU should be able to receive status messages from the RCUs ("Poll Response") and from the End-Of-Train RCU ("Supply Pipe Status"). Finally, the HEU should be able to receive unsolicited messages from all of the RCUs. These unsolicited messages may be asynchronous to the normal message timing and generally convey unexpected events, such as a sudden loss of supply pipe pressure.

Figure 3:
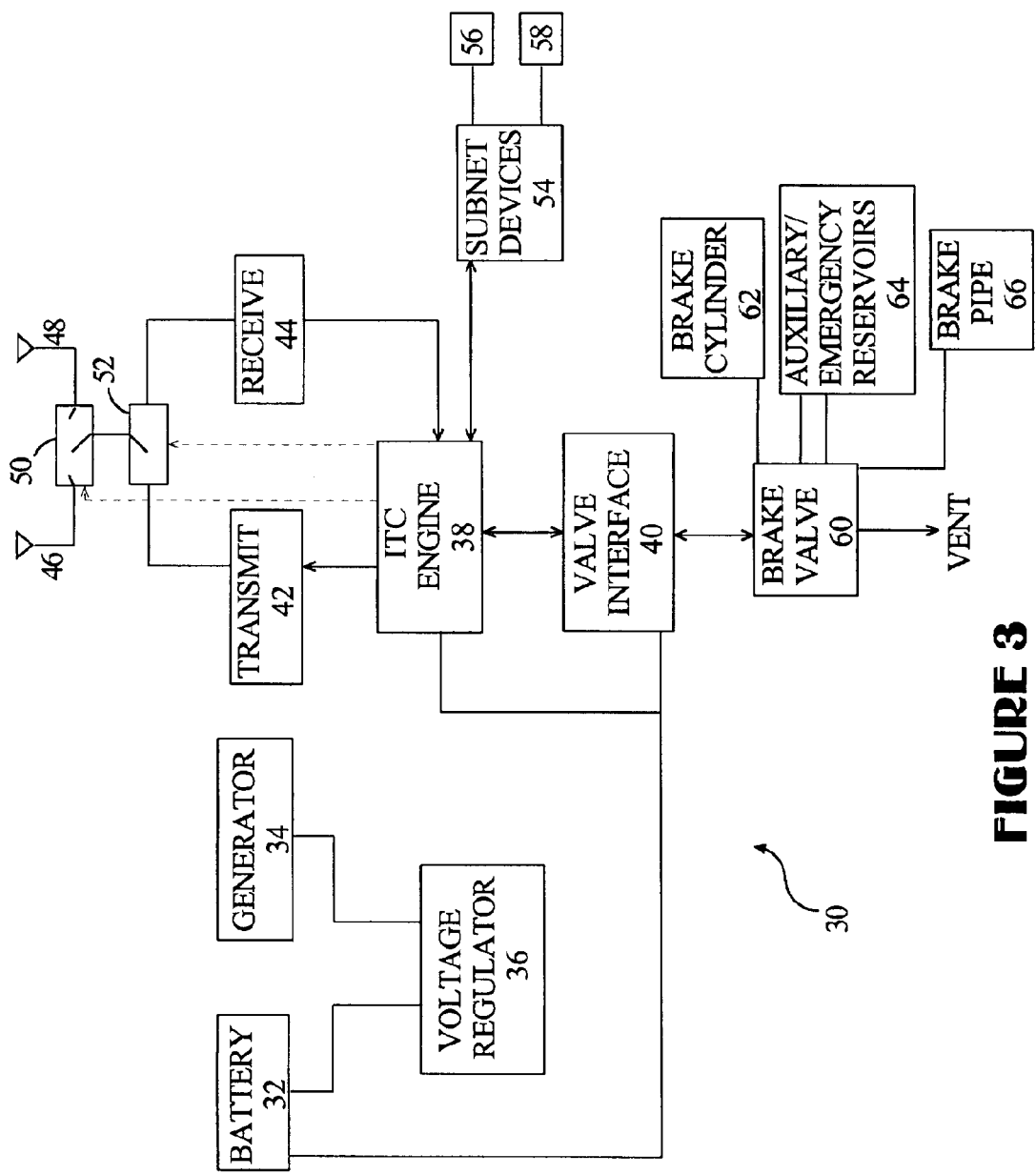
FIG. 3 is a simplified functional block diagram of a node communication system which may be used in a system of the present invention.

With reference to FIG. 3, the messaging requirements of a communications system in accordance with the present invention may be carried out by a car control device ("CCD") 30 in which power is supplied by a battery 32, which may be recharged by a wheel-mounted generator 34 through a voltage regulator 36. The power may be supplied to the various electronic elements of the CCD 30, including an IntraTrain Communications ("ITC") engine 38, a valve interface 40. The ITC engine is a processor which controls the communications between the car and the HEU through a transceiver consisting of a transmit function 42 and a receive function 44 which may receive radio signals from or provide radio signals to diverse antennas 46, 48 through an antenna switch 50 and a transmit/receive ("T/R") switch 52.

The ITC engine 38 also controls the communication to other devices on-board the car through a subnet devices controller 56 which is connected to various subnet devices, 56, 58, such as sensors, application communications modules, environmental controls, etc. The ITC engine 38 also controls the operation of the brake valve interface 40 which, in turn, controls a brake valve and the associated brake cylinder 62, auxiliary and emergency reservoirs 64 and a port to the brake pipe 66.

In operation, messages received from outside the car, such as from a HEU, are received by one or both diverse antennas 46, 48, are demodulated and decoded by the receive function 44 and are provided to the ITC engine 38. If the message is addressed to the particular car or is a message to which the car should respond (such as a braking message), the ITC engine will perform the tasks specified by the message and, if appropriate, will reply to the message, all as is further explained in detail below. The actions which can be taken by the ITC engine are varied and can include operation of the brake valve interface 40 in accordance with any braking commands received, passing application messages to the appropriate application via the subnet devices controller 54, receiving application messages to be transmitted over the RF network from external applications on the sub-net controller, updating its own data tables, and/or obtaining and reporting status information.

Information which is to be reported to the HEU or other cars can be formatted and prepared for transmission by the ITC engine 38 and supplied to the transmit function 42 for amplification and transmission along on of the diverse antennas 46, 48. Which antennas 46, 48 is to be used by the transmit and receive functions at a particular time is controlled by the ITC engine 38 as further explained below to obtain improved reliability communications through spatial antennas diversity. Thus, the diverse antennas 46, 48 will usually be mounted on opposite sides of the railcar.

Figure 4:
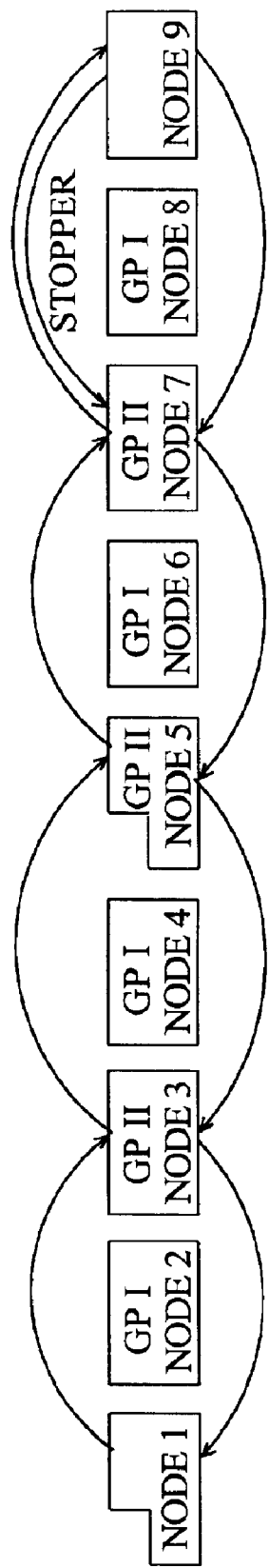
FIG. 4 is a pictorial diagram showing the relaying of packets in a system of the present invention.

Any number of communications protocols could be used, with varying degrees of success, to pass messages from one car of a train to another. The selected protocol must be able to pass messages reliably within a train, be relatively free of interference from similar communications on other trains or from intruders, communicate messages within the time latency requirements for the systems being controlled (e.g., braking systems), and be able to handle different types of messages from different types of rail vehicles, all within an environment which changes as the train moves along the track and which may be filled with adverse environmental factors. Moreover, the selected protocol must address the inevitable equipment failure of various system components and be able to continue operation despite the absence of one or more nodes within the communications system. In one embodiment, the system and method of the present invention includes a communications protocol which satisfies these and many other constraints faced by a communications protocol on a moving train. With reference to FIG. 4, each of the rail vehicles of a train can be considered a node of a communications network. In the protocol used in this embodiment, one of the nodes is considered a pilot node and one of the nodes is considered a reversing node. Usually, the pilot node will be at the locomotive and the reversing node will be at the last functioning car in the train (the "End-of-Train" car) Each node is given a logical address corresponding to its position within the train (NODE 1, NODE 2 . . . NODE 9) starting with the pilot node. Each car in the network is also assigned (usually during linking) to a relay group, with the pilot node and the reversing node being assigned to all groups.

Each message sent along the network includes the address of a designated relaying node (along with the address of the ultimate recipient node, if any). Any node which successfully receives and decodes a message may accept the message and act on it, if appropriate.

In normal operation, message packets originate at the pilot node, are forwarded to the reversing node, and if appropriately tagged, are returned back up the train to the pilot node using a sequence of predefined relay nodes, i.e., the relay groups. As an example, the pilot node creates a packet, labels it with a sequence number which has not been used recently, selects one of the predetermined relay groups to carry the message, labels the packet with the identification of the relay group, designates the first relaying node within the identified relay group as the relaying node for this packet, sets a hop count to one and transmits the message packet on one of its diverse antennas. With reference to FIG. 4, the pilot node (NODE 1) may select to send the packet using Group II and accordingly places the address of NODE 3 (the first node in Group II) in the relay address of the packet. If the designated relay node receives the packet, it determines the next relay node for the identified relay group (NODE 5 in the example), addresses the packet to that node, increments the hop count by one and transmits the packet on the same antenna on which it was received. This relaying of packets continues until the packet reaches the reversing node (NODE 9 in the train of FIG. 4).

As the packet is relayed down the train, each node which receives the packet decodes the packet and operates on its contents, if appropriate. Thus, in the example train of FIG. 4) NODEs 2, 4, 6, and 8 are not explicitly addressed by the relayed packets but are highly likely to be able to receive the packets. When the packet is received and decoded, each of the non-addressed nodes reviews the message(s) contained in the packets and acts responsively. For example, if the message is a brake command addressed to all nodes, each of the receiving nodes operates its brakes in accordance with the message, even though the packet was not explicitly addressed to it. On the other hand, if the decoded message is a status query to the reversing node (NODE 9), all of intermediate nodes will disregard this message.

To ensure reliable communications, each node seeks confirmation that each packet that its sends has been successfully received by the relaying node. In a conventional communications system, such a confirmation could be received by an explicit acknowledgment message provided by the receiving node; however, such acknowledgments consume considerable bandwidth of the communication medium and are not generally used in this aspect of the present invention. Rather, when a node in the present invention relays a packet, it records the hop count of the packet and schedules a time to retransmit the packet. If the relaying node "hears" the packet being further relayed (by the relay recipient) before the retransmit timer expires, the relaying node knows that the packet was received correctly and cancels the retransmission. Note that the relaying node does not require that it hear the relayed (acknowledging) packet error-free. If the acknowledging packet has a valid train ID and hop count, the relaying node can consider the packet to have been received. The acknowledged node can assume that the node sending the transmission received it error free or it would not have forwarded it. If, on the other hand, the original node does not hear the implicit acknowledge within a predictable time period, it can assume that the destination node did not receive the packet error free, and thus did not relay it.

The reversing node has additional responsibilities than the intermediate nodes. Since there are no further nodes in the network, another relay is not needed to continue the packet toward the end of the train. However, unless the last relaying node is notified that the reversing node has received the packet, that relaying node will retransmit the packet. To prevent these unneeded transmission, the reversing node will transmit a "stoppers" packet which can be a short packet serving as an explicit acknowledgment that the last relayed packet has been received. The stopper packet may be a short packet which the reversing node addresses to itself, thus eliminating any further expectations of retransmission. In addition, the reversing node also serves to initiate an in-bound (moving toward to pilot node) packet. The inbound packet may contain a repeat of any messages from the outbound packet which were marked for "rebound", messages from any applications operating at the reversing node, responses from the reversing node itself (brake pipe pressure, for example). The inbound packet is addressed to be carried by the same relay group that carried the messages on the outbound journey; the flag in the packet is set to designate that it is an inbound packet, the hop count is incremented and the packet is transmitted by the reversing node. The inbound packet sent by the reversing node will be sent for relay by the first node in the reverse relay group (this node may be, but is not necessarily, the same as the last node in the outbound relay group). With reference to FIG. 4, the reversing node sends the packet to the first Group II node on the reverse path, i.e., to NODE 7. The packet is thereafter relayed by each of the relay nodes in the same manner as was the outbound packet, described above. Similarly as for outbound packets, each relaying node sets a retransmission timer which will cause a retransmission of the packet if the node does not "hear" the further retransmission of the packet by the next relay node. When the packet arrives at the pilot node, the pilot node sends a stopper packet to expressly acknowledge receipt of the packet and to turn off the last relaying node's retransmission timer.

In one embodiment of the present invention, relay nodes which include the reversing node in their routing tables may take special functions if the packet to the reversing node is not acknowledged. As usual for relaying nodes, if a relay node's transmission to a reversing node is not acknowledged, the relaying node will use the antenna diversity and target diversity schemes of the present invention to prevent stalling of the packet; however, if the target node is the reversing node and no acknowledgement is received, the relay node will reverse the packet (setting the appropriate fields and forwarding the packet up the reversing, inbound, path) and will set a flag in the packet indicating to the pilot node that the packet was reversed by a node other than the reversing node. In this way, the pilot node can know to take action to investigate the cause for the short-path reversal and to rearrange the network as required.

While the inbound packets are relayed in a fashion similar to the outbound packets, in one embodiment of the present invention, each of the relaying nodes for inbound packets may add messages to the packet within certain limits described below. Thus, when NODE 7 receives the inbound packet in the train of FIG. 4, NODE 7 may append to the packet various messages bound for the pilot node. For example, NODE 7 (or any of the other of the relaying nodes for a particular inbound packet) may append messages concerning the brake pipe pressure, the status of any applications operating on the railcar associated with the node, responses to polls from the pilot node, etc.

In operation, the pilot node uses the above-described protocol to command the various nodes and to obtain the status of any of the nodes. Each packet sent by the pilot node may contain a brake signal. The packet may also contain messages polling for the status of any of the nodes or of any application running on any of the nodes. Additionally, the packet may contain throttle commands or other engine related commands (tractive effort, use of sand, etc.) for distributed power units (which may access the train's communications network like any other rail vehicle) When the ITC engine within a node receives a packet and determines that the sequence number has not been seen recently (explained further below), the ITC engine may make copies of each message within the packet applicable for each of the applications running on the node and provide the copies to the appropriate applications. The applications may process these messages and generate reply messages, either responsively or on an ad hoc basis. These messages may be appended to the next inbound packet that the node is asked to relay, subject to a maximum packet length. When the messages from the applications are received at the pilot node, the pilot node will distribute each of the application messages to its applications, thus completing the message cycling needed to maintain a complete status of the train.

Figure 5:
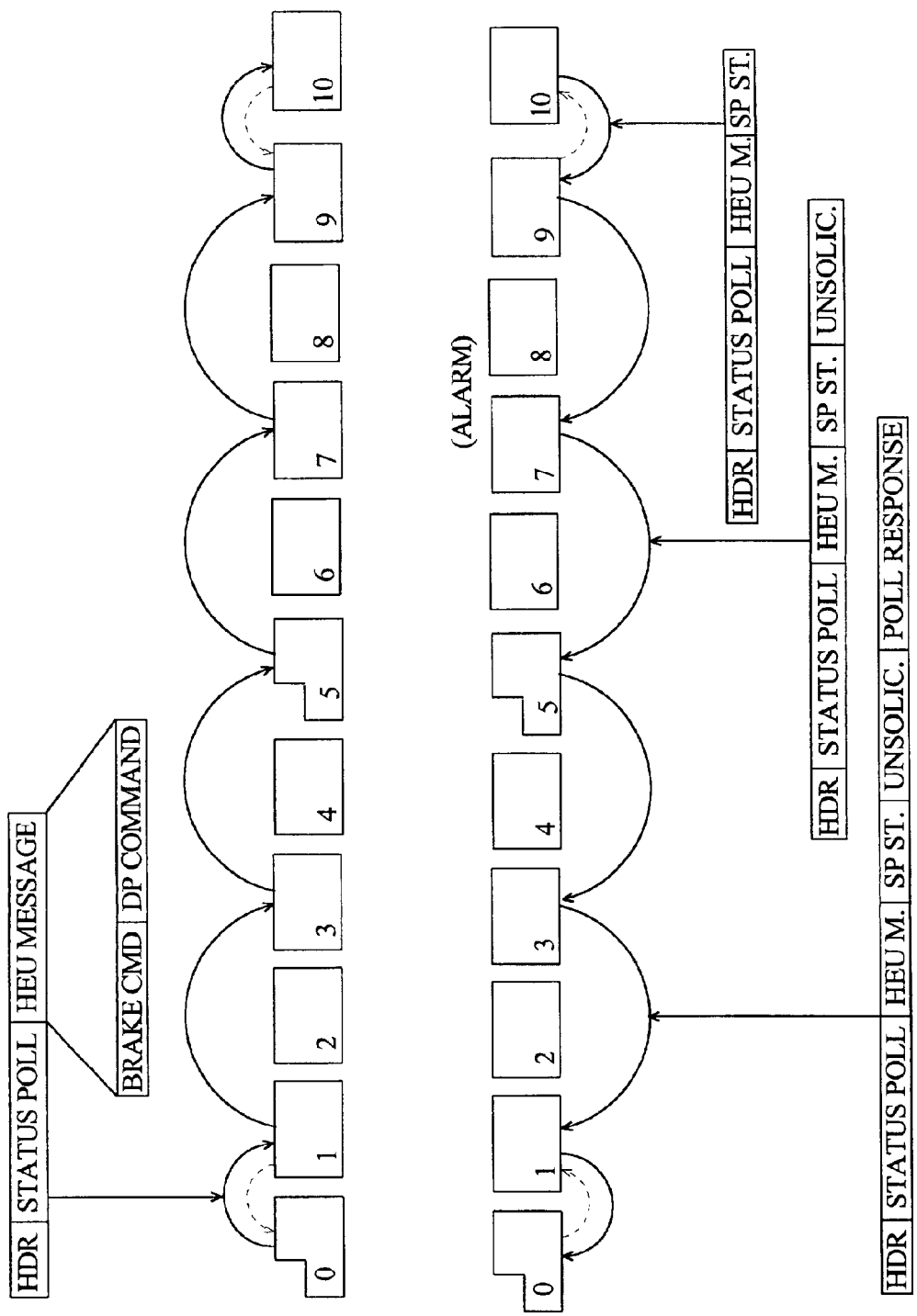
FIG. 5 is a pictorial diagram showing additional details of the relaying of packets and an outline of a message format in a system of the present invention.

An example of packet routing and message appending can be seen in the schematic diagram of FIG. 5. The packet flow for the outbound packet is shown by the train at the top of the diagram. The flow of inbound packets is shown by the train at the bottom of the diagram. In the exemplary system of FIG. 5, the relay groups have been set up so that the even numbered nodes belong to a first group and the odd numbered nodes belong to a second group. Above the outbound packet train and below the inbound packet train are depicted a message outline showing the general contents of the packets being sent between the indicated locations. (Note that the message outlines are brief and ignore many of contents, administrative and otherwise, of a typical Packet in the present system).

With continued reference to FIG. 5, the pilot node (Node 0) initiates the packet by generating the packet to include three messages: a status poll command for Node 3 ("STATUS POLL" in the message outline, a brake command ("BRAKE CMD") for all nodes and a command to a distributed power unit at Node 5 ("DP COMMAND") At about the same time, Mode 7 detects an alarm condition and generates an unsolicited message to be sent to the pilot node. Because the last outbound packet was sent through the first group of relay nodes, the pilot node addresses this message to be relayed by the second group of relay nodes (the "odd numbered" nodes) and addresses the packet appropriately in the header ("HDR") and sets the hop count to one. The packet is then transmitted by the pilot node which also schedules a retransmission in case an acknowledgment is not received.

With continued reference to FIG. 5, Node 1 receives the packet, recognizes that the packet is from its train and notes that the sequence number is not one which it has not seen recently. Accordingly, Node 1 copies the messages encapsulated within the packet and sends them to the appropriate applications (specifically, the brake command message in the example). Node 1 also recognizes that it is the identified relay node and that the packet is an outbound packet being transmitted along the second relay group. Node 1 obtains he identification of the next outbound node within the second relay group (which is Node 3), sets the designated relay node field in the packet to this value, updates the header information (including the hop count) and transmits the packet. Node 2 records the hop count (now set to two) and schedules a retransmission of the packet in case an acknowledgment is not received.

Nodes 2, 3, 4 and 5 receive the packet successfully from Node 1. Each of the receiving nodes notes that it has not seen this copy of the packet before, copy the encapsulated messages and forward the messages to the appropriate applications. Node 5, for example, sends the braking command to the brake application and the DP command to the distributed power application running at the distributed power unit. Nodes 2, 4 and 5 note that they are not the identified relaying node and make no attempt to relay the packet. Car 3 notes that it is the designated relaying node and relays the packet (to Node 5) just as Node 1 had previously. Car 3 also sends the Brake and Status Poll commands to the appropriate applications executing on the node for processing.

Node 0 (the pilot node) also receives the packet sent by Node 1. Node 0 notes that the packet was sent by a car on its train and that its hop count (2) is greater than the hop count it is scheduled to retransmit. Accordingly, Node 0 cancels the scheduled retransmission of the packet.

Node 5 receives the packet successfully from Node 3 and verifies that it was received from a node on its train. Because it has received this packet previously, and there are no new messages in the packet, Node 5 does not send a copy of the application messages to the various applications. Node 5 determines that it is the designated relay node and relays the packet (after appropriate updating of the fields in the packet) to Node 7.

The sequence of events is repeated at each of the nodes receiving the packet until the packet reaches the reversing node (Node 10). As with all messages, the reversing node ensures that the packet was sent by a node on its train and that it has a sequence number not recently seen. The reversing node, accordingly, sends a stopper packet to cause Node 9 to cancel its retransmission. In addition, the reversing node formats a packet for an inbound journey. The inbound packet is similar to the outbound packet, changing the direction flag to inbound. Each message which has been tagged by the pilot node for "rebound" is included in the inbound message. (In the example system of FIG. 5, the status poll, brake command, and distributed power command were designated for rebound) Rebound of the message increases the probability that all nodes, even those not included in the current relay group, receive the message. The reversing node appends a message providing the pilot node with the status of the brake supply pipe ("SP ST."). The reversing node sets as the relay node in the packet the operative node in the second group, i.e., Node 9, updates the remaining header fields and retransmits the packet on the same antenna on which it was received.

Each of the nodes on the inbound packets process the packets in a fashion similar to that used for the outbound packets, ensuring that the packet was received from a node on its train, distributing application messages not previously distributed, and relaying the message back to the pilot node. However, for inbound packets, each of the relaying nodes has an opportunity to append a message which its wants to send to the pilot node. In the example of FIG. 5, Node 7 will add an unsolicited message ("UNSOLIC.") notifying the pilot node of a sensed alarm condition. Likewise, Node 3 will append its Poll Response message ("POLL RESPONSE") to the inbound packet. The ability of the relay nodes to add messages to the inbound packets may be limited by priority and bandwidth considerations as explained further below.

When the inbound packet reaches the pilot node from Node 1, the pilot node sends a stopper packet [dashed message line] to terminate the retransmission timer at Node 1.

Note that the commands and messages which are shown in FIG. 5 are illustrative only and that other commands, messages and message formats may be used within the scope of the present invention. For example, the status poll request shown as a part of the header of the packet could be sent as an application message within the body of the packet. Similarly, the response by the EOT in which the Service Pipe Status is automatically placed into the packet could be made the responsibility of a client application which communicated the Service Pipe Status information in a fashion similar to other application information. By way of further example of the flexibility of the present invention, the pilot node could explicitly poll the status of nodes 3, 8, and 10 by having plural application messages contained within an outbound packet. These messages would normally generate three response messages, all of which would be contained in the inbound packet (subject to bandwidth limitations, discussed below).

In an alternative embodiment, rather than use the group relay scheme designated by a pilot node, the nodes in one embodiment of the present invention may determine for themselves the distance which messages can be reliably transmitted and select as the primary target the node at that distance. For example, the relaying node could attempt to relay a packet ten nodes ahead. Nodes in between the relaying node and the destination node can await to see if the destination node acknowledges the message. If the message is acknowledged, the intermediate nodes need inquire no further (attending to their duties of distributing messages to their hosted applications) If the message is not acknowledged, the intermediate nodes can in turn acknowledge the message (starting with the node next before the destination node). Note that if another node has already acknowledged the message, a relay node will not acknowledge the message. By keeping track of which node acknowledges its packets, a particular relay node can dynamically determine the node to which can be sent reliably. Because the RF environment associated with a moving train changes, the relay node may periodically attempt to push the relayed packet out further and analyze the results. Similarly, if the packets being relayed by a particular node are regularly being acknowledged by a closer node, the particular node can update its routing table to relay its packets to the closer node. In this way, the nodes attempt to forward the packet as far as reliably obtainable, reducing the number of hops (and time) needed for a packet to traverse the entire train.

The Retransmission System

The foregoing description of a communication system which may be used in the present invention has focused on normal or routine operations of the communications system. However, because the communication system will be operating in a harsh and changing RF environment, it is expected that nodes will occasionally be inoperable, that RF signals will receive considerable interference and noise causing multipath effects, cancellation and simple destruction of packets, and that the trains using the communications system will operate in locations in which RF communications are degraded such as tunnels. Accordingly, a successful communications system which provides the reliability and latency needed for train operations must accommodate such outages and adverse effects. In one embodiment of the system of the present invention, the reliability and latency issues are addressed directly by the retransmission system.

In its simplest form, as explained above, the retransmission system which may be used in the present invention includes a timer which causes a node to retransmit a packet if an acknowledgment of the packet is not received within a predetermined period of time. When the retransmission timer expires, the node may resend the packet, this time on the other antenna from that used the first time. In this way, if one of the antennas are inoperative or if the RF propagation conditions on one side of the railcar are less than ideal, the use of the other antenna helps to ensure packet delivery. Again, upon the retransmission of the packet, the relaying node sets its retransmission timer and, if an acknowledgment message is not received before the timer expires, the relaying node retransmits the packet to a new destination node. During setup of the network, each node is provided with a logical address (as discussed above) and with an identification of three forward (outbound) target nodes and three reverse (inbound) target nodes. The first target node will generally be the next node (inbound and outbound) in the relay group in which the node is assigned. This node may be called the Primary Target. The second set of target nodes, called the Secondary Target, are generally nodes which are closer to the relaying node but are not necessarily in the same relay group as the relaying node. Finally, the third set of target nodes, called the Fallback Target, will be a set of nodes close to (generally next to) the relaying node. Thus, the Fallback Target generally represents the node to which communications may most likely be successful. In operation, the relaying node first tries to relay a packet to the Primary Target, using first the "preferred" antenna (usually the antenna on which the packet was received) and then of the "alternate" antenna. If the transmission is not acknowledged, the relaying node attempts to retransmit the packet to the Secondary Target, first on the preferred antenna and then, if needed, on the alternate antenna. Finally, if the transmission still has not been acknowledged, the relaying node attempts to resend the packet to the Fallback Target, first on the preferred antenna and then on the alternate antenna.

In one embodiment of the present invention, the identification of the various target nodes may be provided to each relaying node at network link-up and may be maintained in a routing table by each relaying node.

As will be understood by those skilled in the art, the distance between nodes will often be the most significant factor in determining whether a packet is likely to be communicated successfully from one node to another. At the same time, the farther apart the spacing between primary nodes, the less time will be needed for packets to traverse the length of the train. During link-up, the trains network manager will select and assign the routing tables based on several factors, including the distance between specific nodes (some railcars vary in length from 24 to 95 feet), whether the antennas are located on one end of a car or the other, whether a particular node is reporting a strong signal, etc. The routing tables can then be downloaded from the pilot node to the relaying nodes. In addition, the pilot node will monitor packet performance during operation of the train and adjust the routing tables as needed to provide a network in which packets are quickly and reliably transferred the length of the train. For example, the network manager can examine the hop count field of inbound messages which reach the pilot node. If the hop count is relatively high or if the elapsed time for the packet to be received is relatively high, a relatively high number of retransmissions may be occurring and the network manager may command the utilization of a less aggressive relay routing table. On the other hand, if the network appears to be operating with very few retransmissions, the network manager may command that a more aggressive routing table be used (i.e., a routing table in which the distance between Primary Targets is increased).

Generally during link-up, the routing table utilized by the nodes is a default table in which all the nodes are members of the same relay group. In other words, each message during linkup may be sent from one node to its adjacent node. Once all the nodes have been linked, the network manager in the pilot node may determine a more aggressive routing table to use and download the routing tables to each of the nodes.

The routing tables may contain the Primary, Secondary and Fallback Targets for each relaying node for each relay group established by the network manager. The targets are specified by the network manager to maintain the packets within the assigned relay groups to the extent practical and to return a packet which has been relayed outside of its assigned relay group back to its assigned relay group. Thus, if a relaying node is part of a particular group, its Primary Target within that group will generally be the next destination address within the group. If the node is not a member of the group, the Primary Target will generally be set to return the packet to the normal members of the group. For example, in a two group relay setup in which all the even numbered nodes are in group A and all the odd numbered nodes are in group B, if a packet designated for Group A is set to be relayed by Node 4, the routing table of Node 4 would likely be set to Node 6 (the next destination within Group A). If a packet designated for Group B is set to be relayed by Node 4 (a Group A node), the routing table for Group B at Node 4 would specify a Primary Target within Group B (nodes 5, 7, 9 etc., depending upon how aggressive a routing sequence has been set). Thus, if a Group A packet arrives at a Group A node (Node 4, for example), the node's routing table will attempt to keep the packet for relaying within Group A. If a Group B message is received by a Group A node, the routing table for the node will attempt to return the packet to Group B by setting a Group B node as the Primary Target.

In order to permit the train's network manager to rapidly command the nodes to change from one form of routing to another (from a less aggressive routing strategy to a more aggressive strategy, for example), the routing tables downloaded to the nodes during setup may include plural relay group configurations of varying aggressiveness. With reference now to FIG. 6, the train's network manager may establish seven different relay group configurations, each configuration containing a relay group solution and routing tables corresponding to each solution. Thus, when the network manager desires to change from one configuration to another, to increase or decrease the aggressiveness of the relay groupings, a simple message indicating the relay group solution which is to be used may be sent to all the nodes for a rapid reconfiguration. In an alternative embodiment, the relay group code may be included in the header of the packet. In this configuration, a separate message is not required to change relay groups. Such an embodiment has the advantage that no reconfiguration needs to be accomplished at the relay nodes and there is no latency as the new relay group is implemented as part of sending the next packet down the train.

Message Priority and Bandwidth Allocation

The communication system of the present invention is intended to carry messages both to and from nodes within (and sometimes without) the train. Some of the information which is carried may be of relatively low priority such as the current temperature in a refrigerator car or the setting of a car's handbrake. Other packets may be vitally important such as certain fault alarms from the braking system.

In one aspect of the present invention, messages may be allocated different levels of priority. Regular priority messages may contain non-critical information such as the status of non-vital systems, unsolicited responses containing non-critical status, routine polling messages, etc. These messages have the lowest priority available and in normal operations will likely be the most numerous in a train. "Brake" priority messages have the highest priority of the normal messages since the train's brakes are the safety critical system on the train. Brake messages include normal status polls and responses from the brakes, as well as unsolicited brake messages. "High" priority messages may be used for critical information, safe as safety critical unsolicited responses from on-car systems, etc. A fourth priority message, Severe priority, may be used for messages that must get through the system with a minimum of latency.

Priority of messages outbound from the pilot node are relatively straightforward. Because the pilot node is the only node to place messages on an outbound packet, the pilot node can fill an outbound message with the highest priority messages awaiting transmission. If any messages remain after a packet is sent, they may be queued for the next packet.

In one embodiment of the present invention, the inbound path may require a more complicated priority scheme. By the nature of the network, nodes near the end of the train have a greater accessibility to an inbound packet's bandwidth that those nodes nearer to the pilot node. If a priority system or other arrangements were not made, nodes nearer the pilot node may have to await an unacceptably long period of time before relaying a packet in which there remains enough room in which to append a message. In other words, if allowed, the nodes near the reversing node could completely fill the space available in an inbound packet, leaving no room for downstream nodes to add their messages. Such a situation could be particularly problematic if an upstream node filled the packet with Routine priority messages and denied downstream packets with an opportunity to append High priority messages (for critical data).

To guard against the filling of the packets by the upstream nodes in one aspect of the present invention, the bandwidth of each packet is allocated based on message priority. Some of the bandwidth of the packets is reserved for more important messages. In one embodiment, the bandwidth of the packet is split into three sections. The first section can be used for messages of any priority; the second section may be used only for High priority or Brake priority messages; and, the third section is available only to Brake priority messages. The biasing of the bandwidth allocation prevents a node near the end of the train from completely filling an inbound packet with Routine priority messages.

In addition, each node may be limited in the number of High priority messages which may be appended. In an exemplary system, each node may be limited to appending one High priority message each to a packet. Thus, the packet may contain many High priority messages, but only one from a particular node. There are many situations than can cause multiple nodes to generate High priority messages. For example, a broken brake pipe causing a rapid loss of brake pipe pressure will likely be detected practically simultaneously by plural nodes. The one High priority message per packet limitation ensures that the pilot node receives the High priority message from many different nodes. (If only one node is able to report a High priority message such as a loss brake pipe pressure, the pilot node is unable to distinguish whether the brake pipe has truly lost pressure or whether the pressure sensor on the single reporting node has failed.)

While the specific limitations for the various priority messages may be established according to the specific message format being used, the inventors of the present invention have found advantageous a subdivision of the packet's capacity in which seventy percent of the packet can be used for any priority message, the next sixteen percent of the packet can be used for High and Brake priority messages, and the remaining fourteen percent of the packet can be used for Brake priority messages. Note that a node adding data to a packet is expected to put High and Brake priority messages into the packet before it places Routine priority messages.

If implemented, a Severe priority message causes the node to reverse an outbound packet. Generally, only one Severe message can be appended to the packet and no lower priority messages can be appended. Severe priority messages may also be sent outbound, and such messages cannot be reversed by a pending inbound Severe priority message. Thus, the pilot node can send critical messages using a Severe message priority and be confident that the packet will not be circumvented in its outbound trip. (As used herein, a Severe Message Token (or packet) may be called a "SMOKEN").

The bandwidth allocation of a communication system of the present invention is also controlled by the use of relay groups which tend to distribute the available message bandwidth among the nodes. For example, in a two hop situation (two relay groups each having every other node as a member), the nodes near the front of the train only have to share bandwidth with half the other nodes towards the end of the train. For a four hop situation, the nodes at the front have to share bandwidth with only one quarter of the nodes further down the train. Thus, the relay groups help to distribute the bandwidth of inbound packets and improve the throughput of the system (it is less efficient to carry/relay a full packet through a node on the network). Long hop routing solutions tend to get vital commands to the end of the train more quickly and tend to level the loading of the inbound packets as described above.

Asynchronous Packets

The foregoing has described a network in which packets are relayed synchronously from the front to the rear and than back to the front of a train. There are instances when such synchronous communications may not be sufficient or desirable and the present invention includes the capability to send asynchronous packets (where asynchronous designates that the packet is not sent as part of the "norma" packet forwarding and reversing of the network). Such asynchronous packets may be sent, for example, when the network is being linked, when a linked node believes itself to have become unlinked, or when a node desires to transmit a packet immediately and not await a synchronous packet in which it can append its message.

An asynchronous packet may be identified by a special code in the header (such as all ones in the sequence field) or other flag.

When a linked node fails to hear normal synchronous packets for a predetermined period of time (e.g., 4.0 seconds), the node may suspect that it has become detached from the network (perhaps because the host railcar has become detached from the rest of the train). The node creates an asynchronous packet, addresses it to itself, inserts a loss-of-communications message, and transmits the packet. Any nodes receiving the packet understand that it is an asynchronous packet and forward a copy of the embedded ADUs to the application layer. The nodes do not attempt to relay the packet. (The applications may analyze the embedded ADUs, realize that a node has lost communication, and notify the pilot node using synchronous communications.) If the node which receives the asynchronous packet also believes that it has lost communications with the network, the node may conclude that the railcars have become disconnected from the train and cause the brakes of the host railcar to be applied. To ensure that the brakes are not applied because of a transient condition, the node may require that it hear loss-of-communication messages from more than one other node (in addition to itself). To prevent overlap (and transmission collisions) with other nodes which may be experiencing the same condition, each node may await a random period of time after detecting a loss-of-communication before it sends the asynchronous message.

Asynchronous packets may also be sent by nodes in response to host applications which request that a message be sent by an asynchronous packet. In such a circumstance, the node need not await an inbound packet onto which it can append a message but may transmit the message asynchronously. As described above, nodes receiving the network to relay the message to the pilot node.

The structure of the asynchronous packet is similar to that of a synchronous packet; however, many of the fields have no significance and are not used (Hop Count, Sequence Count, etc.)

Packet and Message Structure

Those skilled in the art will appreciate that the communication system of the present invention could be implemented with a variety of packet and message structures. However, the inventors hereof have found that the packet and message structure described below to be particularly advantageous in carrying out the objects of the present invention. As described repeatedly above, the system of the present invention may be used to carry messages between the nodes of the network. Each packet may contain several messages, each message concerned with one or more application(s) at the receiving node(s). Data may be transferred in the form of data packets, the most fundamental data packet being termed an Application Data Unit ("ADU"). In one embodiment of the present invention, the ADUs may have a fixed structure contained overhead information and up to 64 bytes of free form application data. Special ADUs may be used for downloading code to the nodes in which up to 255 bytes of application data are permitted. With reference to FIG. 7, an ADU may have a format in which certain bits as indicated in FIG. 7 are used to signify various functions or data. The Write Over Flag specifies whether the ADU can be written over by the ITC engine. Messages received by the ITC engine from the applications on a particular node are queued by the ITC engine until they can be placed in an available packet. While such messages are awaiting transmission, the data contained in the message may become stale or invalid. Applications may replace their messages on the transmit queue until just prior to their transmission. A new message will "write over" an old message; however, the new message retains the old messages position within the transmit queue. Messages that are intended to update queued ADUs have the Write Over Flag set.

If the ITC engine is provided with a message with the Write Over Flag set, the engine will search the transmit queue for an ADU that has a matching ADU Id and ADU Type field and will replace that ADU in the queue with the new ADU. If the ADU cannot be replaced (because no such ADU is found or the matching ADU is already in the transmit process), the new ADU is simply added to the end of the queue.

Generally, the originating application sets the Write Over Flag.

With continued reference to FIG. 7, the Rebound Flag indicates that the ADU which is being sent on the outbound path is to be copied to the corresponding inbound packet (by the reversing node). Use of the Rebound Flag is made for ADUs for which it is desirable to maximize the probability that it is quickly received by all affected nodes. For example, a current brake command should be acted upon as soon as possible by all nodes. By setting the Rebound Flag when the message is generated, the pilot node increases the number of reception opportunities that each node has for this message, as the message is sent out on the outbound channel and then on the inbound channel. Less critical messages do not have the Rebound Flag set as this flag doubles the bandwidth consumed by a particular message.

The Source Address is the logical node address of the node hosting the ADU's originating application. A value of zero indicates that the ADU was generated locally.

The Destination Address 1 field defines the first node is a range of nodes to which this ADU is to be delivered. If the range includes zero, then the local node will get delivery.

The Destination Address 2 field defines the last node in a range of nodes to which this ADU is to be delivered. If this value is zero and the Destination Address 1 field is also zero, the ADU is delivered locally only. To address a single node, Destination Address 2 should equal Destination Address 2.

The Source Application ID is set to a value to match a standard set of IDs. Application IDs are used to identify ADU sources and destinations, and are generally assigned to a functional entity (such as a brake control function on a car control device or the network management function on a node) Generally, the originating ADU adds its own application ID to the ADU to give the destination a return address (when combined with the ADU's Source Address). Any message sent in response to a received ADU should be addressed to the requesting application. In an alternative embodiment, the application IDs could be allocated to the applications by the network management scheme, particularly during setup of the train.

The ADU Type identifies one of a number of predetermined message types associated with the application identified in the Destination Application ID. Once an ID is assigned to an application type, the application is understood by the communication system to have a set of messages, i.e., commands and responses, unique to the application. In one aspect of the present system, once an ADU has been defined for an application, the ADU becomes the standard for that application, there being no global definitions of the types of ADUs used by an application. However, ADU types can be defined which have the same meaning for plural applications types.

The Embedded ADU Data is a field of free form data from zero to 64 bytes in length. The size of the data block must match the Application Data Unit Length field.

The ADU Checksum is a sum of all the bytes in the ADU up to the checksum. Any conventional checksum logic can be used; however, in a preferred embodiment, the checksum is calculated as the two's complement sum of all of the message bytes with each byte of the ADU being treated as a two's complement signed character.

Generally, the system of the present invention will not accept or deliver ADUs containing invalid checksums. In addition, if a nodes network modifies the contents of an ADU (adds the Source ID, for example), the network updates the associated ADU Checksum field.

In a preferred embodiment of a system of the present invention, information may be passed between nodes in the form of Radio Data Units ("RDUs"). RDUs contain overhead information which is used by the communication system and up to sixty four Application Data Units (ADUs), such as described above. With reference now to FIG. 8, the Circuit Identification Code identifies a unique communication circuit which is transferring the RDU. Within a communication system, there may be plural circuits identified. For example, in a preferred embodiment of the present invention, three circuits may be used: a Service Circuit, A Train Link Circuit and a Maintenance Circuit. The service Circuit may be the default for all nodes on the network. Any packet received and marked with a Service Circuit ID will be received by a node. The service circuit is the circuit used to link nodes into the network and is generally the only way to communicate with a node which has not been linked into the network. The Service Circuit may also be used as a maintenance interface to a linked node (or alternatively, a Maintenance Circuit may be implemented in a network and used for the maintenance interface or for status monitoring by equipment not directly linked to the train's synchronous network, such as wayside equipment). The Train Link Circuit identifies a train network in a linked mode. All normal communication within the network will be marked with the unique code used for the Train Link Circuit. In a preferred embodiment, the Train Link Circuit ID is guaranteed to be unique by basing the ID on a hardware address chip installed in the pilot node's communication equipment. Because the Train Link Circuit ID is unique messages from one train's network will not be acted upon by nodes in another train's network.

The Circuit Identification Code may be added to the RDU immediately prior to transmission. Note that the Circuit identification Code is broken into a 16 bit segment and an eight bit segment. The 16 bit segment may be used by the RF transmission equipment for receive packet filtering. In some types of conventional RF Transmission equipment, the equipment is capable of supporting up to four such 16 bit codes at a time. Prior to acceptance of any message, however, the entire twenty-four bit Circuit Identification Code must be matched in a system of the preferred embodiment.

The Token Type f lag indicates whether the RDU received was a severe message token, or SMOKEN. A value of zero implies this message is a normal synchronous message or an asynchronous message, a value of one implies this message is a SMOKEN. The node which changes a packet to a SMOKEN is responsible to set this bit and to make sure that the resulting direction flag for the RDU is correct. An outbound SMOKEN will be rerouted as an inbound SMOKEN by the reversing node.

The Sequence Count is used to identify packets as they move through the network. Each fresh packet is given the next sequence count in the sequence count cycle. Nodes of the network use the Sequence Count to determine if they have seen a particular packet before. The sequence count cycle runs from zero to thirty and back to zero. Thus a sequence count is not repeated for thirty-one fresh packets. The sequence count value of fifteen is used for asynchronous messages.

The network manager of the pilot node is responsible to assign a new sequence number to each fresh packet. The network managers of the nodes are responsible to preserve that number as the message passes over the network. The sequence number is used for multiple chores including keeping a log of which packets have been received and which packets have been forwarded.

The one bit Direction Flag indicates if the RDU received was outbound (moving from pilot node to reversing node) or inbound (moving from reversing node to pilot node). The bit is defined as 0 for outbound and 1 for inbound.

Each outgoing packet has its Direction Flag initialized to zero by the pilot node. Each relay node's network manager is expected to preserve this value as the packet passes over the network. The reversing node changes the Direction Flag before it transmits the return packet. Again, on the inbound path, the relaying nodes preserve the value. There is an exception to this rule. If a node turns the token around for any reason (a SMOKEN is transmitted for example) the network manager of the node reversing the packet is expected to change the Direction Flag.

For a synchronous transmission, the Hop Distance is a four bit two's complement value, which can be added to the transmitting node's logical address to get the current destination node's address. The network can keep metrics on which nodes it can hear, and this field is used to generate the metric.

The Hop Count carries the hop count associated with the current packet. Each node that retransmits the packet will increment the hop count by one. Thus, when the packet is received at the pilot node, it will have the count of the number of nodes that retransmitted it. Note that this is not the count of total transmissions, since some node may have had to transmit the value several times. Thus, the pilot node can use this information, in conjunction with other information (such as the round trip travel time) to assess the health of the network. As described above, the Hop Count is used in the acknowledge algorithm to identify transmissions that can serve as acknowledgments of previously transmitted packets.

Each outgoing packet has its Hop Count initialized to one by the pilot node. All other nodes depend on their network processing to maintain the value in the packet and to increment it on each new relay of the packet.

The Short path Flag is set by a node if a standard synchronous packet is reversed by a node other than the current reversing node.

If there is some difficulty in communicating with the current reversing node, the routing table may reverse the packet at a node inbound of the reversing node. If this happens, the Short Path Flag must be set by the node that accomplishes the reversal. The pilot node may monitor received packets and report to its operator interface when it receives a packet that has been short circuited.

The Relay Group field defines the relay group associated with the current packet. This value will be zero for the default relay group. It will range between one and twenty one for typical hop configurations. Each outgoing packet is assigned a relay group by the pilot node. All other nodes depend on their network processing to maintain this value in the token as it passes through. Asynchronous packets (high and low priority) may be marked with a relay group of 0x0. The default relay group is 0x0. With reference to FIG. 6, the pilot node may cycle through the relay groups associated with a particular solution. In one embodiment, there are seven defined solutions, and each one is made up of a predefined set of relay groups. Thus, for example, a node using solution three (a three hop solution) would typically cycle between relay groups 4, 5 and 6. If the pilot node decided to switch to a less aggressive solution then it would modify the sequence. It may, when sending a relay group 4 packet decide to switch to a two hop solution, resulting is a pattern such as 4, 5, 6, 4, 5, 6, 4, 3, 2, 3, 2, 3, 2, 3 . . .

The ten bit Destination Node Address carries the logical address number of the next node that should retransmit the current packet. A node checks this field to determine if it is a relaying node and should relay the received packet or if it can simply receive and process the packet.

The one byte Session Tag value is incremented by the pilot node each time the node is unlinked and relinked. As they are linked, each node receives the new Session Tag value associated with the link. All nodes monitor the messages received to ensure that the link sate has not change without their knowledge. For example, is a linked train was unlinked to add some additional cars and then relinked, and one of the nodes did not receive the unlink command, it would believe that the link state of the network had not changed and thus may respond to the same logical address as one of the newly linked nodes. By noting the discrepancy in the Session Tag, however, the node would realize that the train had been relinked and could act accordingly (not responding to its old logical address).

The ADU Count field indicates how many ADUs are embedded in the current RDU. This field is update or passed by the network processing of a node depending on whether the ADU Count in the message has remained unchanged or if new ADUs have been appended into a RDU prior to its (re-)transmission at that node.

The Embedded ADU field contains the ADU data, i.e., the bits of the ADUs. This field in the RDU is as big as necessary to carry the embedded ADUs.

The Cyclic Redundancy Check ("CRC") is used to determine if the current packet was received successfully. If the locally calculated packet CRC does not match the embedded packet CRC, the received packet must contain bit errors and should not be divided and redistributed as ADUs.

The CRC may be added to the RDU as the packet is transferred. It is also checked by the RF Communications equipment on each packet as it is received. Even though it is supplied as part of the received packet, it is not used by the network software directly. The RF Communications equipment marks the receive packet as good or bad as it is received. The CRC may be encoded using any conventional CRC scheme.

The length and order of the fields shown in FIGS. 7 and 8 is intended for illustrative purposes only. Each of the fields of a message in the present invention may be of different size or in a different order from that shown in the message formats of FIGS. 7 and 8. In addition, additional fields or fields which are coded differently may also be used and come within the scope of the present invention.

The Pilot Node

As indicated above, the pilot node is generally responsible for initiating the regular flow of packets so that messages can be carried around the train network. The regular packets are sent in a form of synchronous communications along the network. In implementation of the communication system and method of the present invention, the pilot node also may perform other functions. For example, the pilot node will often be co-located with the locomotive of train, which will usually include the applications controlling the train's brakes and the operation of any distributed power units within the train. These applications will each generate a significant amount of communications traffic, both inbound and outbound.

In a system of the present invention, communications and control are available throughout the entire railway system. Applications can be implemented in the pilot node which will cause status information and control data to be received from the train network and forwarded to: (a) the railway's central control facility; (b) a satellite receiver; (c) a customer's private communication system, etc., merely by providing an appropriate radio link between the locomotive (or the pilot node location) and the desired remote control point. Thus, railway personnel or customers will be able to know not only the location of their railway car but the status of its contents. Similarly, railway personnel or appropriate customer personnel may be permitted to send ADU commands to the pilot node for forwarding via the train's communication system to the appropriate node(s) and application. All such communication between the train's communication system and the "outside" world can be conducted from merely another application executing on the pilot node.

In addition, and as mentioned above, the pilot node will usually be responsible for establishing and analyzing the reliability of the Relay Groups. In carrying out this function, the pilot node takes its own metrics of the network's performance as well as receiving status messages from the nodes as to the performance of the communications network locally to the particular node supplying the information. From this information, the pilot node can determine if a particular Relay Group is not desirable, whether certain routing actions are not indicated, whether some of the Relay Groups should be redefined (because, for example, of ad hoc equipment failures), etc. Some of the information available to the pilot node directly from the network performance includes the number of hops needed for a packet to make a round trip and the number of packets which are stalled (i.e., transmitted outbound but never received inbound), etc. In addition, each node (including the pilot node) can collect and send to the pilot node considerable information concerning the performance of the network local to a particular node. For example, each node can track (and provide to the pilot node): the number of stalled relay attempts, the number of relays which were successful for each type of retransmission, the number of short path routes required, the number of valid packets received on each antenna, the number of asynchronous packets transmitted, the number of attempts (and success rate) of communications with each of the nearby nodes using a specified antenna, the number of packets received from specific nearby nodes inbound and outbound, The foregoing list is illustrative only and demonstrates the vastly different performance data which can be collected, reported to the pilot node and analyzed by the pilot node in controlling the makeup and use of the routing tables and the relay groups.

The pilot node may also be responsible for initiating fresh packets on a periodic basis. Fresh packets can be generated periodically and/or in response to the inbound receipt by the pilot node of the last transmitted packet. To prevent the pilot node from overwhelming the other nodes, a minimum and maximum time can be associated with the generation of fresh packets. A new packet will not be sent upon the receipt of the last packet unless the minimum period of time has elapsed. Similarly, a fresh packet will be sent regardless of the non-arrival of the last packet if the maximum period of time has elapsed. In this way, the pilot node will not overwhelm the nodes with packets and will ensure that packets are sent sufficiently often so that the nodes will recognize that the train's network is operational. While the specific times for the minimum and maximum timing of the transmission of nodes will vary by the conditions of the train, the inventors hereof have found that the following times are advantageous in the system of the present invention:

Minimum time=300 msec.
Maximum time=$t_{nom}$+120 msec. (for $t_{nom}$>180 msec.)
where $t_{nom}$=No.Hops * ($t_{obtx}$+$t_{ibmcx}$+2$t_{proc}$)+($t_{rev}$−2$t_{proc}$)
No.Hops=number of hops (one way)
$t_{tbtx}$=outbound transmission time $t_{ibmcx}$=maximum inbound transmission time (4.567 msec.)
$t_{proc}$=processing time at a node (about 2.0 msec.)
$t_{rev}$=reversing node delay (50 msec.)

The outbound transmission time is a function of the number of bits to be transmitted in the fresh packet and is equal to:

((No.Bytes*8)+423 bits)(1 ms/1000 bits)

Reducing the above equations, the pilot node may estimate the maximum time to equal:

(No.Hops * ((No.Bytes+8990)/1000)+166) msec. In a system in accordance with a preferred embodiment of the present invention.

Another of the functions typically performed by the pilot node is the assignment and assessment of the relay groups. The pilot node specifies the relay group to carry each packet by inserting the identity of the group into the packet. To assess the reliability of the current relay group, the pilot node can measure the time from the beginning of the transmission of a packet until the packet is received back in pilot node. If the packet has not been received in the maximum round trip delay (as computed above and based on the number of hops required by the current relay group routing solution), the network manager of the pilot node may set the current routing solution to the next less aggressive solution, down to solution 1. Thereafter, the pilot node can continue to assess the reliability of the routing solution in a similar fashion.

To avoid thrashing of the system, the pilot node may await and time several packets before again resetting the routing solution, either up or down. For example, the pilot node may await for at least five round trip packets before again changing the routing solution. If the routing solution is satisfactory, the pilot node may attempt to extend the routing solution to a more aggressive solution, but not to exceed a predetermined base routing solution defined by the network manager.

Network Management at the Nodes

As noted earlier, each node in a train's network may have plural applications executing simultaneously. Accordingly, the communications manager function at the node should be capable of communicating data to and from the network to the various applications executing on it. In other words, the node must be capable of switching messages among its own applications, one or more subnets operating in conjunction with the node, and externally (to the pilot node, to remote applications (via wireless communication through the pilot node), etc.

In one aspect of the present invention, the network manager at each node receives each packet which is successfully received over the physical link (and correctly addressed, etc.).Each of the packets may contain one or more messages which must be examined and, if appropriate, delivered to various destinations associated with the node. The node may keep a message routing table called an ADU distribution list. Each entry in the list may be termed a destination. Each ADU received, whether it was locally generated ADU or one received from an RDU, is checked against the ADU Distribution list. The ADU Distribution List may be modified by the node as applications are operating at the node. The node will attempt to deliver any received ADU to its addressed location, be it a local address, a subnet address, another address within the node or a address at another node (which must be delivered through RDUs).

One source of messages received by the node are the RDUs transmitted over the radio. As valid radio packets are received, the packets are transferred to the communications manager for processing. Specifically, the node communication manager must extract each of the ADUs from the packet and distribute them locally based on the ADU Distribution List. Because messages from the RDUs may be received several times (in the original messages, in an relay of that message, in a rebound of the message and in a relay of the rebound of the message, etc.), the same packet may be received several times. In fact, the packet may not be identical each time received as it is possible that one or more of the other nodes have added ADUs. If all embedded ADUs were simply extracted and distributed to the various applications, each destination would get multiple copies of the same ADU (one copy corresponding to each reception of the RDU). On the other hand, if all but the first reception of the RDU were ignored, the applications would not be provided with any ADUs which were added to the packet after it was first received by a node. Accordingly, the node communication manager must keep track of which RDUs were received and how maximum number of ADUs which have been present in the RDU. Accordingly, the node communication manager can ignore new copies of RDUs so long as the number of embedded ADUs is less than the maximum associated with that RDU.

Network Architecture

The functions of the communications system described herein can be carried out by a variety of different logical and physical structures. The inventors of the present invention have found that the functions can be adeptly carried out using a structure as depicted in the architecture diagram depicted in FIG. 9 to which reference is now directed. In the preferred architecture, the system may be implemented in three major parts: the Network Stack 120, the Sub-net Interface 140, and the Network Manager 160. In general, the Network Stack 120 is the nucleus of the network. All communications via the network pass through the Network Stack 120. The Network Manager 160, the Sub-net interface 140 and the other Local Applications 170 all connect to the network stack, as do external applications via the physical channel interface at the bottom of the stack. Note that the network is not bound to any particular client applications. Undoubtedly, the network will have particular application to trains, train braking, train distributed power, and train on-car sensors but the network is not limited to these applications and devices.

Figure 9:
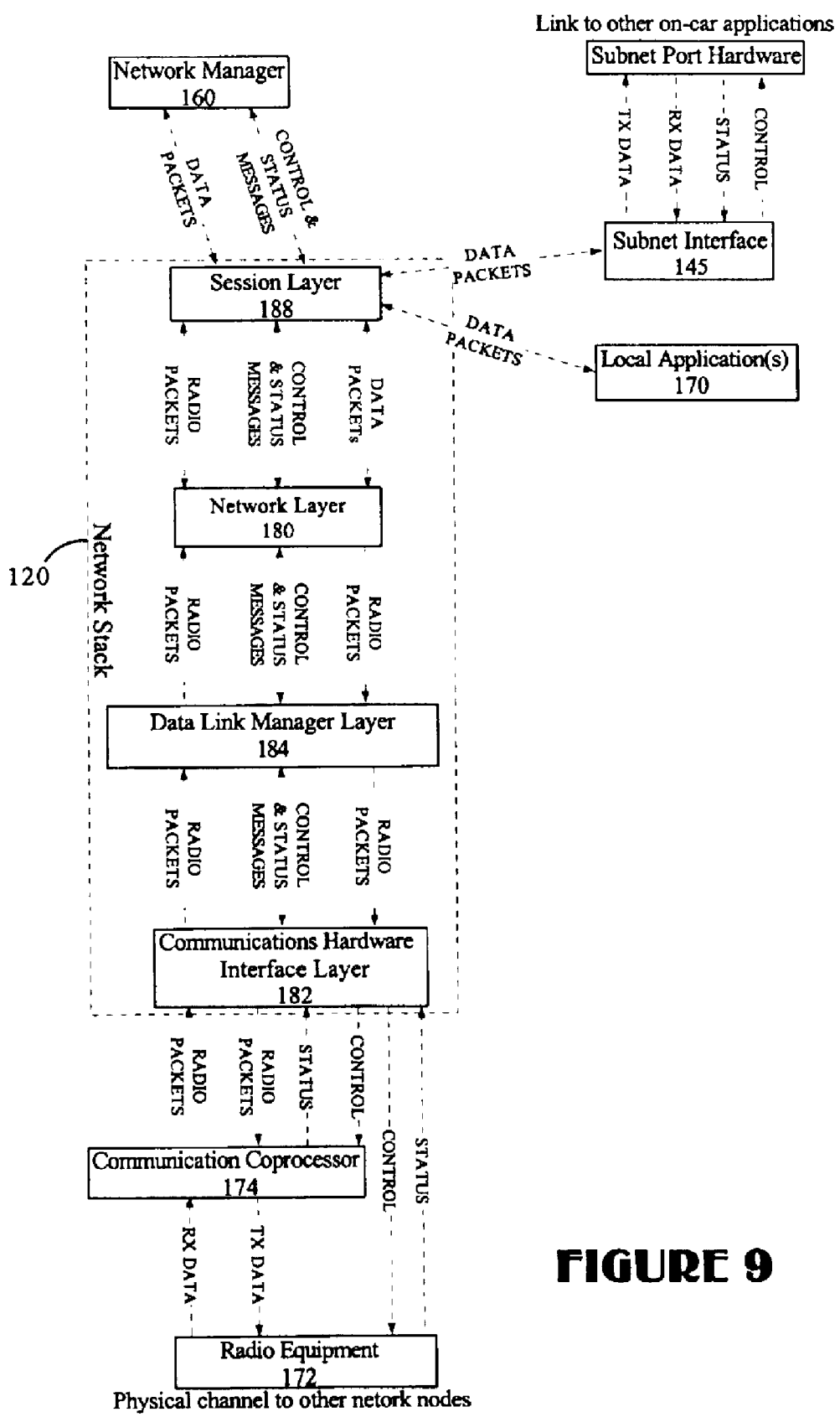
FIG. 9 is a simplified functional block diagram of an architecture which may be used to implement a system in accordance with the present invention.

With continued reference to FIG. 9, the architecture of a preferred embodiment of the present invention may include radio equipment 172 which provides a physical RF channel to other network nodes (many of which will have a similar architecture but such is not necessary). The radio equipment 172 receives data to be transmitted (TX DATA) and returns data which has been transmitted by others (RX DATA) to a communications processor 174. The radio equipment 172 may also provide status signals to the Network Stack 120 and receive control signals (such as antenna selection commands) from the Network Stack 120.

In one embodiment of the present invention, the radio equipment 172 comprises low power 2.4 GHz direct sequence spread spectrum radio transceivers. Use of the direct sequence spread spectrum provides additional assurance that only signals from an appropriate source are accepted as the PN sequence used to perform the spreading must match the sequence expected by the receiver to ensure that the message is received properly. Generally, the radio equipment attempts to lock to an incoming transmission if one is available (and an outbound transmission is not scheduled). When searching for a signal on which the lock, the communications system may cause the radio equipment to dither from one antenna to another at a periodic rate until an appropriate signal may be locked on. Once an appropriate signal is locked, the radio equipment may cease the dithering between antennas. Appropriate logic circuits within the Network Stack 120 may cause the dithering by sending signals along the control leads between the Network Stack 120 and the radio equipment 172. In one embodiment of the present invention, a dither rate of approximately 2.7 kHz has been found to provide acceptable results.

With continued reference to FIG. 9, the radio equipment 172 may also send status information to the Network Stack 120. For example, the radio equipment 172 may report on the status of radio lock, the currently selected antenna, and whether dithering is active.

The Network Manager 160 controls and monitors network operation at a macro level. The Network Manager 160 controls top level operation of the network by implementing network startup and shutdown, linking the network nodes, metrics gathering and reporting, and generating unsolicited alert messages in response to irregular or fault conditions in network operations.

The Sub-net Interface 140 appears to the Network Stack 120 as a local application. The Sub-net Interface 140 implements a communication link to external, on-car applications; that is, applications running on the same railcar as the ITC engine, but usually running on another processor. Generally, there will be a hardware link between the processors of the Sub-net Interface 140 and the external applications, such as a standard stop/start asynchronous (UART) link via an RS-485 four wire full duplex connection. Other links, such as a wireless link or another. standard/non-standard connection may be used. Thus, the Sub-net Interface 140 can be used to connect the network to external applications on freight cars such as bearing temperature monitors, load monitors, refrigerator car monitors, etc. For example, the Sub-net Interface can be used to implement a link between an operator interface module (display and input device) and the ITC engine in a locomotive.

The local applications 170 may include applications executing on the same processor or an associated processor as the Network Stack 120. For example, the brake control application may transmit and receive data packets to and from the network stack 120 to implement a braking scheme using an electronic control and/or monitoring.

The design of the Network Stack 120 be may be modularized, dividing the functionality into four layers: a communications hardware interface layer 182, a data link manager layer 184, a network layer 186, and a session layer 188. The session layer 188 serves as the switchboard for the network system in the present invention. The session layer 188 routes messages from application to application. This layer facilitates local delivery, on-car remote delivery (via the sub-net interface), and off-car remote delivery (including routing messages from remote sources to local applications).

The session layer acts as a communications hub, receiving messages of various types from multiple sources destined for multiple destinations. Generally, the session layer 188 either relays or discards these messages depending upon its current routing information and on the current state of the network. In performing its task, the session layer 188 may keep the ADU Distribution List, discussed earlier. The session layer uses this ADU Distribution List for routing messages to applications. Each ADU received which is addressed to the local node, whether it be locally generated or from an RDU passed through the radio link, is checked against the ADU Distribution List and will be delivered as defined in the List.

The ADU Distribution List can be configured such that one received ADU may be distributed to several different destinations. The ADU Distribution List can also be configured so that multiple ADU types are delivered to a single destination. The entries in the ADU Distribution List and the routing associated with the ADUs can be altered by the Network Manager 160.

With continued reference to FIG. 9, the Network Layer (or "Network Relay Layer") 186 is responsible for the flow of synchronous packets down and back up the train. In the pilot node, the Network Layer 186 formats commands received from the operator interface into messages carried by the packets. In the other nodes, the Network layer 186 is responsible for attaching responses, both solicited and unsolicited, to the packets as they return on the inbound path. The Network Relay layer 186 is also responsible for generating asynchronous packets needed to communicate before the network is fully established or in the situation that the network is not operating correctly.

The Network Layer 186 may also be responsible for generating fresh packets. In the other nodes (the relay nodes), the Network Layer 186 is responsible to receive and relay (retransmit) packets to the next destination node. In the process of relaying the packet, the Network Layer will extract any new ADUs. Additionally, the Network Layer 186 will attach ADUs to inbound packets which it is relaying. Finally, for reversing nodes, the Network Layer 188 will turn the direction of the packet propagation from outbound to inbound and change the role of the reversed packet from a command conduit to a response conduit.

With continued reference to FIG. 9, the data link manager layer ensures that outbound packets are relayed from node to node down the train, successfully reaching the reversing node; and that inbound packets are relayed from node to node up the train, successfully reaching the pilot node. The data link layer 184 uses antenna diversity, relay target diversity and a retransmission strategy to minimize the chance that a packet will stall on a relay attempt (i.e., fail to reach its propagation to the terminal node on its path).

In one embodiment of the present invention, the first relay transmission is always sent using the antenna on which the packet was originally received. Since transmissions on the corresponding side of the train were just proven successful, it is likely that additional transmissions also will be successful (and that the implicit acknowledgement to the last relay node will be successful).

In the event that the first communications path is not corking at that time (due to multipath, faulty antennas, jamming, the train is on a curved path outside the antenna's effective propagation, etc.), the data link manager layer 184 will attempt to send the transmission using the diverse antenna (on the other side of the train). Generally, the RF environment at the diverse antenna will be very different from that seen by the original antenna so there is often little chance that the cause of the first failure of communications will result in a failure on the second attempt. Thus, the antenna diversity, when combined with the retry/acknowledgement scheme provides a robust node to node communication link.

If the packet is not acknowledged after the second attempt, the data link manager layer 184 will cause the selection of another target relay node (the "secondary" target), typically one which represents a shorter required transmission distance. Again, the data link manager layer 184 will attempt to continue the packet on its journey using both antennas, first one then the other.

If the packet is not acknowledged after the second attempt at the second target, the data link manager layer 184 will cause the selection of a third target (the "fallback" target) which is typically the node with the shortest hop distance from the source node. Again, both antennas will be tried, in turn. With this combination of antenna diversity, target diversity and acknowledgement scheme, the probability of one successful transmission of any packet is high.

Linking the Network

In carrying out the communications system described herein, it is advantageous for the each of the nodes to be provided with a logical address which corresponds (roughly) with the physical order of the nodes in the network.

Such information can be provided to the network via the operator interface in the form of a manifest which identifies the railcars in the network and their location within the network. In one embodiment of the present invention, upon starting the network, the pilot node communicates to each relay node and the reversing node their logical addresses and the routing tables described earlier.

In another Embodiment of the present invention, the pilot node and the relay nodes can self-determine their position within the train through a linking procedure. In the linking procedure, when a node is started, it monitors assigned channel(s) and attempts to link up. For example, if a node is started (or has been disconnected from a network), the node can "wake up" and monitor the linking channel. To save power in a network system installed in a train, the node may also check the brake pipe to determine whether the pipe is pressured and remain "asleep" unless the pressure exceeds a predetermined threshold.

In linking the train, the pilot node, in response to operator interaction (or in response to a signal received from a higher-level train management authority) may begin the linking by commanding the initiation of an accurately timed supply pipe pressure pulse (positive or negative) and, after a fixed delay, may announce on the radio link that it is initiating the linking of the train.

All nodes detecting the transmission from the pilot node begin listening for both the supply pipe pressure pulse and the transmission of a packet from any other node (on the linking channel). Each node also initiates a timer for measuring the delay between hearing the Link command and the detection of the pneumatic pulse. A node that does not detect a pulse within a predetermined period of time (e.g., 200 msec.) after hearing the Link command determines that it is either not on the same train or that it is further down the train and will detect the pulse later.

The first node behind the pilot node will detect the pneumatic pulse first (under normal circumstances) and will transmit a message announcing that it is the first node. The node detecting the pneumatic pulse may also sharpen the pulse by venting its supply pipe immediately upon detecting the pulse edge. This technique will help to prevent "smearing" of the pulse edge as it propagates down the train.

Each node that heard the transmission from the first node notes that the first address has ben "taken", resets its timer, and continues to listen for the pulse and another radio transmission. The next node hears the pulse and repeats the sequence that the first node executed but claims in its transmission the "2" address. This process may continue down the train with each node calling out its number in line as the pressure pulse propagates down the train. Note that each node bases its claimed address on the claim of the node immediately preceding it in the train and does not depend on any node, other than the first one, hearing the transmission from the pilot node. Note also that no absolute or system time is required. Each node needs only to measure elapsed time between events that it observes.

While the train is being linked, each relay node will generally hear the "claimed address" transmission of several of its neighbors. Each node may record such reception in a log to include the claimed address, the delay parameter, the time between its own observation of the pneumatic pulse and the reception of the radio message. Thus information may be passed to the pilot node for its use in determining the relay groups or in redesigning relay groups.

After allowing sufficient time for the pneumatic pulse to travel the length of the train, the pilot node can begin polling the nodes to determine the makeup of the train. The polling may make use of the default relay group (usually including each node as a relay node). In one aspect of the present invention, during the linking mode, nodes will not attempt to forward an outbound (command) message beyond the explicitly-address node. The addressed node turns the packet around, adding its response to the pilot node. Nodes with addresses higher that the explicitly-addressed packet will not participate in propagating the packet or react to the contents of the packet.

First, the pilot node explicitly polls by logical address the node that claimed to the NODE 1. That node will return the message and may provide information informing the pilot code of the length and type car hosting the node and the time from the prior transmission to the pneumatic pulse detection. The pilot node will follow up by sending a message addressed to that node that it has been successfully linked to the train. The pilot node then proceeds to poll and confirm nodes with successively higher logical addresses.

The pilot node can review the data it receives to determine whether anomalies or errors occurred during the linking process. If the time between one node and the next detecting the pneumatic pulse is larger than can be accounted for by the length of the car, a possible "dead" node is indicated. The pilot node can also check the list of linked nodes to a manifest list (if any has been provided). Missing, misidentified and unexpected nodes may be indicated to the operator.

Depending upon the slope of the pneumatic pulse and the precision of the pressure sensors detecting the pulse, it may be possible for two adjacent nodes to detect the pneumatic pulse at practically the same time. To avoid having both nodes claiming the same logical address, the nodes can check the linking channel for activity before transmitting its claim. If another node is already on the air, the node may wait for completion of the transmission before transmitting its claim. The waiting node can take the next address after the transmitting node and then will transmit its claim after the prior transmission.

Once all the nodes have been linked, the pilot node may announce a transition to an operation state, commanding the nodes to switch to the operational channel (if a separate linking channel was being used). Generally, after the switch to the operational channel, the pilot node will poll each node to ensure that the node heard the switch and has gone to the operational channel. If after switching to an operational channel, a node does not hear any operational traffic for a predetermined period of time, the node may switch back to the linking channel.

Note that the aforementioned two linking schemes are examples of methods by which a network of the present invention can be linked. Other linking methods can be utilized and remain within the scope of the present invention.

The above descriptions have illustratively used as an example a train having a HEU and plural RCUs; however, the present invention is not limited to such a configuration. It is well within the skill of the artisan to utilize the present invention in a configuration in which a HEU is in the middle of a train (and the communications propagate both forwardly and backwardly) or in a configuration in which plural HEUs exist in a single train. Nor is the present invention limited to trains and may be used in any system in which plural, multiple relays of information, signals or commands may be desired. As mentioned earlier, the preferred embodiment of the present invention uses RF links between nodes but the invention can be successfully practiced by one skilled in the art through the use of other one-to-one and one-to-many communication systems, including magnetic, acoustic and optical.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of determining a physical order of plural railcars in a train consist where the railcars are connected to each other through a pneumatic brake pipe and an RF communication link and where the train consist includes at least one head end unit (HEU), comprising the steps of:
   a. transmitting a pneumatic pressure pulse along the brake pipe from a selected HEU to the other railcars;
   b. transmitting an RF signal from the selected HEU to the railcars;
   c. receiving the RF signal at a first railcar;
   d. receiving the pneumatic pressure pulse at the first railcar;
   e. transmitting an RF message from the first railcar to the HEU indicating the position of the first railcar;
   f. receiving the RF signal transmitted by the first railcar at a second railcar;
   g. receiving the pneumatic pressure pulse at the second railcar;
   h. transmitting an RF message from the second railcar to the to the HEU indicating the position of the second railcar; and
   k. for each remaining railcars successively:
      (1) receiving at least one RF signal transmitted by another railcar announcing the transmitting railcar's relative position;
      (2) receiving the pneumatic pressure pulse;
      (3) determining the relative position of the railcar as a function of the time between the receipt of the pneumatic pulse and the receipt of the immediately preceding RF message transmitted by another railcar;
      (4) transmitting the determined relative position of the railcar to the HEU.

2. The method of claim 1 further comprising the step of modifying the received pneumatic pulse at each railcar prior to retransmission of the pneumatic pulse to thereby facilitate the determination of the time of receipt of the pulse at other railcars.

3. The method of claim 1 further comprising the step of maintaining a log at each railcar, wherein the log includes the time between the receipt of the pneumatic pulse and the receipt of the immediately preceding RF signal from another railcar.

4. The method of claim 3 further comprising steps of transmitting the log from each railcar to the HEU and evaluating the received logs at the HEU to thereby detect errors in the determined position of the railcars.

5. The method of claim 2 where the pneumatic pressure pulse is a positive pulse with respect to the normal pressure of the brake pipe.

6. The method of claim 2 where the pneumatic pressure pulse is a negative pulse with respect to the normal pressure of the brake pipe.

7. In a train comprising at least one head end unit (HEU) and plural railcars connected by a pneumatic brake pipe and an electrical communications link, a method of determining the relative order of the railcars in the train comprising the steps of:
 a. transmitting a pneumatic pressure pulse along the brake pipe from the HEU to the plural railcars;
 b. transmitting an electrical signal from the HEU announcing the transmission of the pressure pulse;
 c. transmitting an electrical signal at each car upon receipt of the pressure pulse;
 d. determining the relative order at each railcar as a function of the difference between the time of receipt of the pneumatic pressure pulse and the time of receipt of the immediately preceding electrical signal.

8. In a train comprising at least one head end unit (HEU) and plural railcars, where the HEU and railcars are coupled together through a pneumatic brake pipe and each railcar and HEU contains a communication unit for sending and receiving electrical signals, a method of determining the relative position of each railcar in the train comprising the steps of:
 (a) transmitting a pneumatic pulse from the HEU to each railcar through the brake pipe;
 (b) transmitting an electrical signal from each railcar to the other railcars and HEU upon receipt of the pneumatic pulse; and
 (c) determining the relative position of each railcar in the train as a function of the difference in time between receipt of the pneumatic pulse and the electrical signal transmitted by another railcar.

9. The method of claim 8 wherein the electrical signal from the step of determining is the immediately preceding electrical signal received from another railcar.

10. The method of claim 8 wherein the step of transmitting an electrical signal from each railcar includes announcing the relative position of the transmitting railcar in the train.

11. In a train comprising at least one head end unit (HEU) and plural railcars where the HEU and railcars are coupled together through a pneumatic brake pipe and each railcar and HEU contains a communication unit for sending and receiving messages, a method of each railcar determining its relative position of each railcar in the train, comprising the steps of:
 a. transmitting a pneumatic pulse from the HEU to each railcar through the brake pipe;
 b. transmitting an electrical signal from the HEU to the railcars;
 c. receiving the pneumatic pulse at a railcar;
 d. transmitting an electrical signal from each railcar upon receipt of the pneumatic pulse;
 e. determining the relative position of each railcar in the train as a function of the time of receipt of the pneumatic pulse and the receipt of an electrical signal from another railcar.

12. The method of claim 11 wherein the electrical signal from the step of determining is the immediately preceding electrical signal received from another railcar.

13. The method of claim 11 wherein the relative order is determined by measuring at each railcar the time between the receipt of the pneumatic pulse and the receipt of the latest received electrical signal from another railcar.

14. The method of claim 13 further comprising the step of transmitting the measured information from each railcar to the HEU.

15. The method of claim 14 further comprising the step of evaluating the measured data received from the railcars to identify errors in the determined position of the railcars in the train.

16. The method of claim 11 wherein the step of transmitting an electrical signal from each railcar includes the step of monitoring for the transmission of other railcars prior to transmitting to thereby avoid having multiple railcars claim the same relative position in the train.

17. In a train comprising at least one head end unit (HEU) and plural railcars where the HEU and railcars are coupled together through a pneumatic brake pipe and each railcar and HEU contains a communication unit for sending and receiving electrical signals, a method of determining the relative position of each railcar in the train comprising the steps of:
 a. transmitting an electrical signal and a pneumatic pulse from the HEU to each railcar;
 b. transmitting an electrical signal from each railcar upon receipt of the pneumatic brake pulse;
 c. determining the relative position of each car in the train as a function of the difference in time between the receipt of the pressure pulse and the receipt of the last received electrical signal.

18. The method of claim 17 wherein the step of transmitting an electrical signal from each railcar comprises transmitting the determined position of the railcar in the train.

19. The method of claim 17 further comprising the step of:
 d. modifying the received pneumatic pulse at each railcar prior to retransmission of the pneumatic pulse to thereby facilitate the determination of the time receipt of the pulse at other railcars.

20. In a method of determining the relative position of plural railcars in a train having at least one head end unit ("LIEU") where the HEU and all of the railcars are connected by pneumatic and wireless communication systems, the improvement wherein each railcar transmits a wireless signal upon receipt of a pneumatic signal and determines its relative position in the train from the difference in time between the receipt of a pneumatic signal originating from the HEU and the receipt of a wireless signal transmitted by the immediately preceding railcar.

21. The method of claim 20 wherein the railcar originating the wireless signal changes as a function of the receipt of the pneumatic signal at the railcars in the train.

22. In a method of determining the relative position of plural railcars in a train having at least one head end unit ("HEU") where the HEU and all of the cars are connected by a common pneumatic communication system and where the HEU and each of the railcars is connected to a plurality of the railcars by a wireless communication system, the improvement wherein each railcar transmits a wireless signal upon receipt of a pneumatic signal and determines its relative position in the train using the time of receipt of the wireless signal received over the wireless communication system in closest proximity to receipt of a pneumatic signal.

23. In a train comprising at least one head end unit (HEU) and a plurality of railcars connected by a pneumatic brake pipe and an electrical communications link with each railcar in the train and the HEU, a method of determining the order of the railcars comprising:

a. transmitting a pneumatic pressure pulse along the brake pipe so as to travel in sequence to each railcar of said plurality of railcars;

b. receiving the pneumatic pressure pulse at the railcars in the train;

c. transmitting an electrical signal from each of the plurality of railcars indicative of the time at which the pneumatic pressure pulse was received at the respective rail car; and d. determining the order of the railcars in the train based on the time of receipt of the electrical signals transmitted by the plurality of railcars.

24. The method of claim 23 further comprising establishing and recording the order of the railcars at the HEU.

25. The method of claim 23 wherein the electrical signal comprises a unique address assigned to each railcar based on the time at which the pneumatic pressure pulse reached the transmitting railcar.

26. The method of claim 25 wherein the unique address is a numerical identifier indicating the position of the other railcars in the train.

27. The method of claim 26 wherein each one of the plurality of railcars self-determines the unique address based on of the railcar in the train.

28. The method of claim 27 wherein each railcar transmits an address-containing electrical signal after self-determining a unique address, and wherein subsequent railcars self-determine an address based on the address-containing electrical signal received from previous railcars in the train.

29. The method of claim 27 wherein upon receiving the pneumatic pressure pulse, the receiving railcar vents the segment of the brake pipe on the receiving railcar.

30. In a train comprising at least one head end unit (HEU) and a plurality of railcars connected by a pneumatic brake pipe and an electrical communications link with each railcar in the train and the HEU, a method of determining the order of the railcars comprising:

a. transmitting a first electrical signal from the HEU to the plurality of railcars announcing the transmission of a pressure pulse along the brake pipe;

b. transmitting a pneumatic pressure pulse on the brake pipe to the plurality of railcars, wherein the pneumatic pressure pulse is received at each of the plurality of railcars after receipt of the first electrical signal;

c. transmitting a second electrical signal from each of the plurality of railcars indicative of the time at which the pneumatic pressure pulse was received at the respective rail car the transmitting rail car;

d. determining the order of the railcars in the train based on the time of receipt of the second electrical signals.

31. The method of claim 30 further comprising establishing and recording the order of the railcars at the HEU.

32. The method of claim 30 wherein the second electrical signal is indicative of a unique address assigned to each railcar based on the time at which the pneumatic pressure pulse reached the transmitting rail car.

33. The method of claim 30 wherein the second electrical signal comprises a unique address indicating the position of the railcar in the train, and wherein the second electrical signal is received by at least one other of the plurality of railcars for use in determining the position of the receiving railcar in the train.

34. The method of claim 32 wherein the unique address is transmitted from each one of the plurality of railcars to the HEU in response to a polling signal transmitted from the HEU.

35. In a train comprising at least one head end unit (HEU) and plural railcars connected by a pneumatic brake pipe and an electrical communications link, a method of determining the relative order of the railcars in the train comprising the steps of:

a. transmitting a first electrical signal announcing a transmission of a pressure pulse along the brake pipe to the railcars;

b. transmitting a pneumatic pressure pulse along the brake pipe to the plurality of railcars, with each railcar receiving the pneumatic pulse at a different time from that of the other railcars in the train, with said time being later than that of the preceding railcars and earlier than that of successive railcars;

c. transmitting a sequence of second electrical signals from the railcars, with one of said second electrical signals being transmitted for each railcar upon receipt of the pressure pulse at that respective railcar; and d. determining the relative order at each railcar in the train as a function of the time of receipt of said second electrical signals.

* * * * *